United States Patent
Colletti et al.

(10) Patent No.: US 12,091,176 B2
(45) Date of Patent: Sep. 17, 2024

(54) MODULAR PASSENGER SEAT SYSTEM

(71) Applicant: The Boeing Company, Chicago, IL (US)

(72) Inventors: Brian Paul Colletti, Mission Viejo, CA (US); Lihan Woo, Cerritos, CA (US)

(73) Assignee: The Boeing Company, Chicago, IL (US)

( * ) Notice: Subject to any disclaimer, the term of this patent is extended or adjusted under 35 U.S.C. 154(b) by 42 days.

(21) Appl. No.: 17/460,027

(22) Filed: Aug. 27, 2021

(65) Prior Publication Data

US 2022/0089286 A1 Mar. 24, 2022

Related U.S. Application Data

(60) Provisional application No. 63/082,688, filed on Sep. 24, 2020.

(51) Int. Cl.
*B64D 11/06* (2006.01)
(52) U.S. Cl.
CPC ...... *B64D 11/0639* (2014.12); *B64D 11/0601* (2014.12); *B64D 11/0696* (2013.01)
(58) Field of Classification Search
CPC ............ B64D 11/0696; B64D 11/0639; B64D 11/0601; B60N 2/01533; B60N 2/79
See application file for complete search history.

(56) References Cited

U.S. PATENT DOCUMENTS

| | | | |
|---|---|---|---|
| 2,409,316 A * | 10/1946 | Rogers, Sr. .............. | A47C 4/22 297/411.33 |
| 5,061,112 A * | 10/1991 | Monford, Jr. ......... | F16B 21/183 403/DIG. 1 |
| 9,655,477 B1 * | 5/2017 | Addesso ................ | A47K 3/127 |
| 2007/0063122 A1 * | 3/2007 | Bowd ....................... | B64C 1/20 248/429 |
| 2017/0129608 A1 * | 5/2017 | Reams ............... | B64D 11/0638 |
| 2018/0304950 A1 * | 10/2018 | Visenzi ..................... | B62J 7/08 |
| 2018/0312084 A1 * | 11/2018 | Does .................... | B64D 11/064 |
| 2020/0385108 A1 * | 12/2020 | Morales ............... | B64C 27/006 |

* cited by examiner

*Primary Examiner* — Joshua J Michener
*Assistant Examiner* — Ashesh Dangol
(74) *Attorney, Agent, or Firm* — Quinn IP Law

(57) ABSTRACT

A modular passenger seat system includes a passenger seat having a seat leg with a distal end portion. The distal end portion includes a tube. The tube includes a sidewall having a first aperture and a second aperture. The modular passenger seat system includes a first detent member and a second detent member disposed within the first aperture and the second aperture in the sidewall of the tube. Each of the first detent member and the second detent member is configured to extend through the first aperture and the second aperture when the tube is received within the bushing. The modular passenger seat system includes a shaft movably disposed within the seat leg. The shaft has a lower end which when displaced against a biasing member enables the first detent member and the second detent member to retract inwardly into the tube.

21 Claims, 16 Drawing Sheets

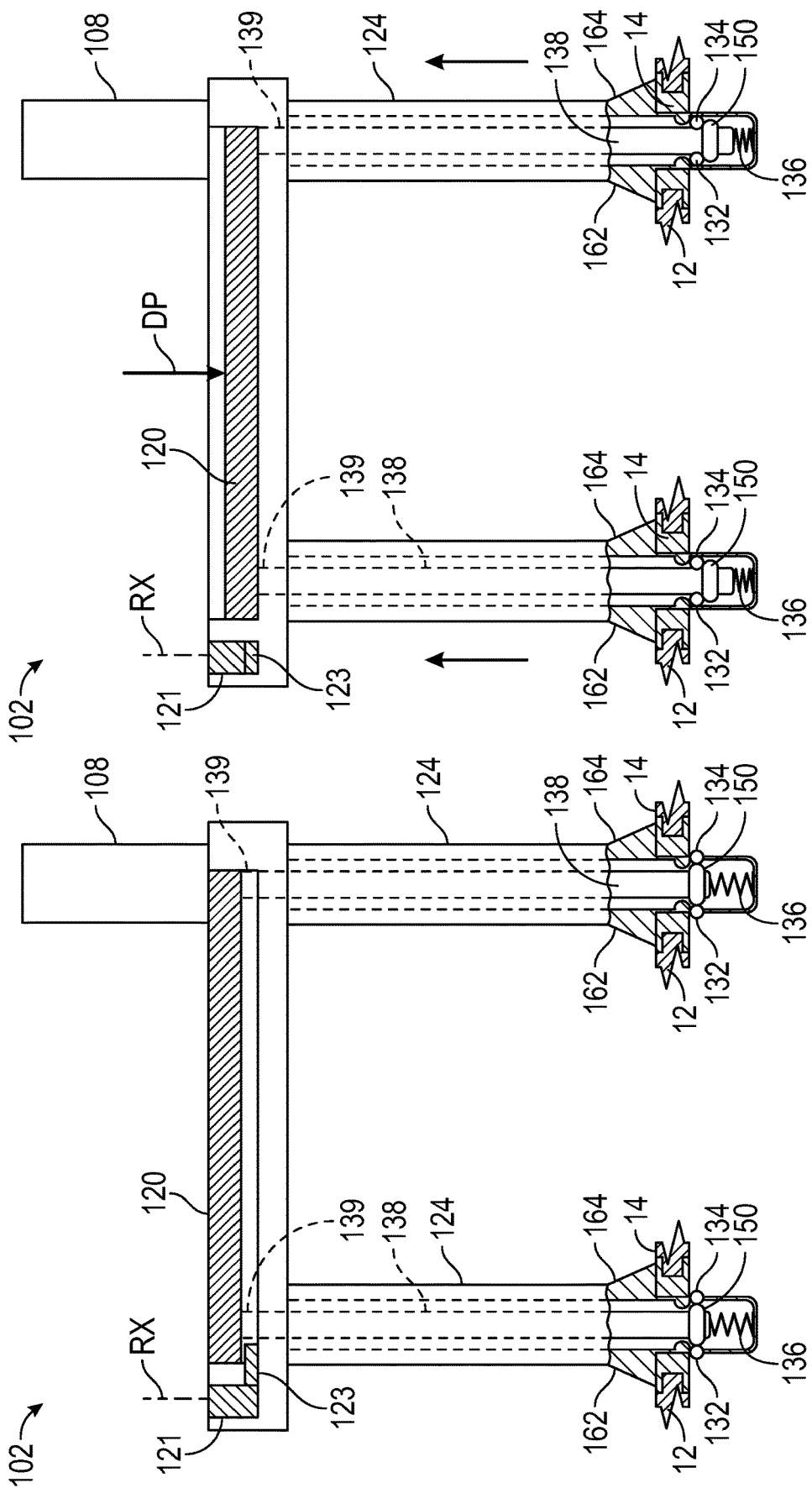

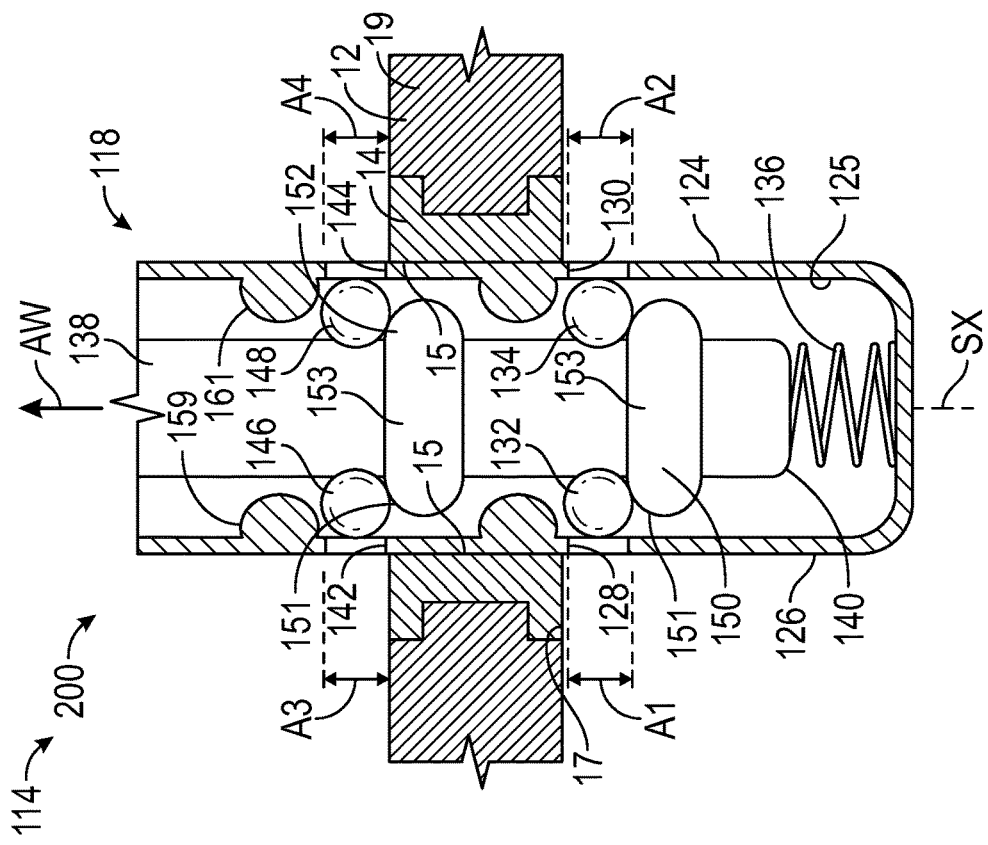
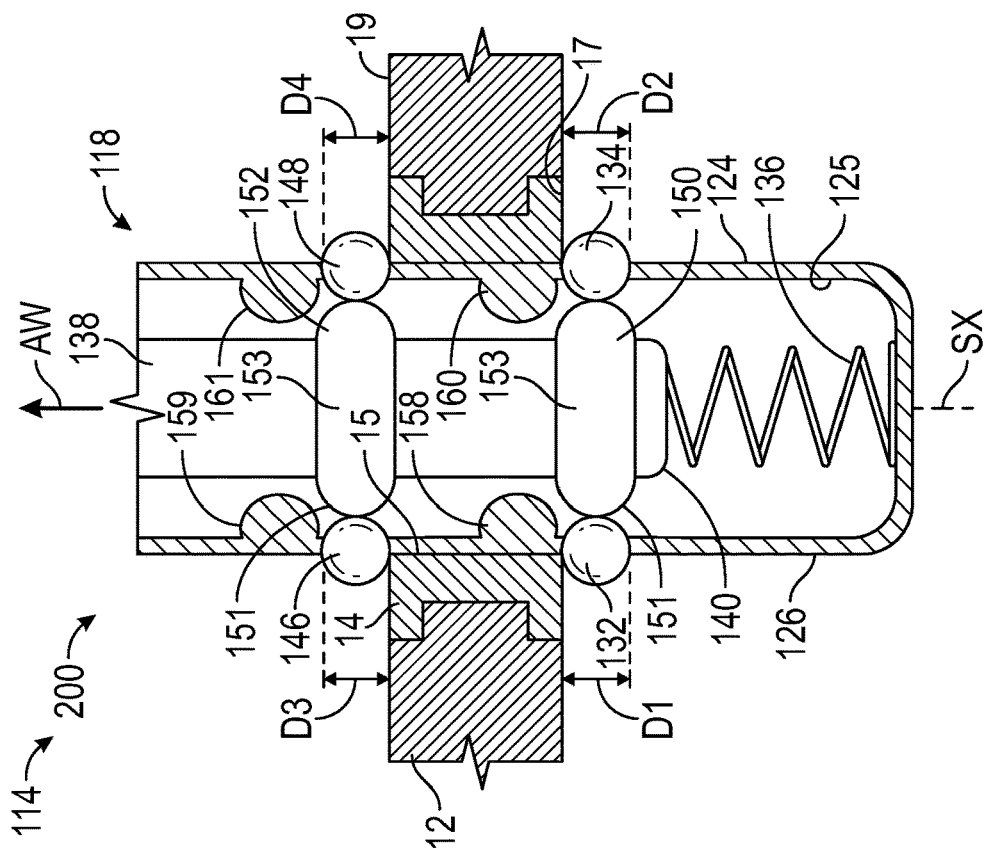

MODULAR PASSENGER SEAT SYSTEM

CROSS-REFERENCE TO RELATED APPLICATION

The present application claims priority to, and the benefit of, U.S. Provisional Patent Application No. 63/082,688 filed on Sep. 24, 2020, the entire disclosure of which is incorporated by reference herein.

TECHNICAL FIELD

The present disclosure generally relates to passenger seats and, more particularly, to a modular passenger seat system.

BACKGROUND

During assembly of some vehicles, such as aircrafts and buses, passenger seats may be rearranged to increase the physical distance between passengers. The process of rearranging passenger seats may be cumbersome and time consuming.

SUMMARY

It is therefore useful to develop a system for quickly and easily rearranging passenger seats in a vehicle, such as an airplane or a bus. The presently disclosed modular passenger seat system allows manufacturers or retrofit companies to quickly and easily arrange or rearrange the passenger seats in a vehicle. In doing so, the manufacturers or retrofit companies can save time and minimize costs.

In an aspect of the present disclosure, a modular passenger seat system for a vehicle includes a passenger seat having a seat leg with a distal end portion. The distal end portion includes a tube configured to be received in a bushing coupled to a vehicle floor. The tube includes a sidewall having a first aperture and a second aperture. The modular passenger seat system further includes a first detent member and a second detent member disposed within the first aperture and the second aperture in the sidewall of the tube. Each of the first detent member and the second detent member is configured to extend through a respective one of the first aperture and the second aperture and contact a lower portion of the bushing when the tube is received within the bushing to retain the tube therein to secure the passenger seat to the vehicle floor. The modular passenger seat system includes a biasing member disposed within the tube. The modular passenger seat system includes a shaft movably disposed within the seat leg. The shaft has a lower end which when displaced against the biasing member enables the first detent member and the second detent member to retract inwardly into the tube to permit release of the tube from the bushing to enable removal of the passenger seat.

The sidewall of the tube may have a third aperture and a fourth aperture. The modular passenger seat system may further include a third detent member and a fourth detent member configured to be received within the third aperture and the fourth aperture, respectively. Each of the third detent member and the fourth detent member may be configured to extend through a respective one of the third aperture and the fourth aperture and contact an upper portion of the bushing when the tube is received within the bushing to retain the tube therein to firmly secure the passenger seat to the vehicle floor.

The modular passenger seat system may further include a retention element disposed around the shaft and a depressible button disposed relative to an upper end of the shaft, which when depressed is configured to displace the retention element on the shaft relative to each of the first detent member and the second detent member to enable each of the first detent member and the second detent member to retract inwardly into the tube to permit release of the tube from the bushing. The retention element may include a retention body disposed around the shaft. The retention body may be configured to contact each of the first detent member and the second detent member to displace the first detent member and the second detent member outwardly relative to the tube and into a respective one of the first aperture and the second aperture upon release of the depressible button to thereby firmly secure the seat leg to the bushing.

The shaft includes an outer shaft surface. The retention element may include a first recess and a second recess each formed on the outer shaft surface of the shaft. The first recess and the second recess are each sized to receive the first detent member and the second detent member, respectively. When the depressible button is depressed, the shaft is displaced to allow the first detent member and the second detent member to retract inwardly into a respective one of the first recess and the second recess to permit release of the tube from the bushing to enable removal of the passenger seat.

The modular passenger seat system may further include a lock coupled to the depressible button. The lock has an unlocked state and a locked state. The lock is configured to prevent the depressible button to be depressed when the lock is in the locked state. The lock is configured to allow the depressible button to be depressed when the lock is in the unlocked state. The lock may be configured to receive a key, and movement of the key received by the lock enables the lock to move between the unlocked state and the locked state.

The first detent member may be a detent ball or may include a detent leg having a planar shape. The detent leg may be pivotally coupled to the shaft to allow the detent leg to be displaced against the biasing member to enable the detent leg to retract inwardly into the tube to permit release of the tube from the bushing, thereby enabling removal of the passenger seat. The first detent member may have a curved shape that partially surrounds the shaft.

The tube may have a main tube portion and a lower tube portion removably coupled to the main tube portion. The main tube portion may include internal tube threads. The lower tube portion may include external tube threads that threadedly engage the internal tube threads to removably couple the lower tube portion to the main tube portion. The lower end of the shaft may include a threaded protrusion. The threaded protrusion includes external shaft threads. The shaft may include a main shaft portion removably coupled to the lower end of the shaft. The main shaft portion may include internal shaft threads that threadedly engage the external shaft threads to removably couple the lower end of the shaft to the main shaft portion of the shaft. The vehicle may be an airplane.

The present disclosure also describes a vehicle. In an aspect of the present disclosure, the vehicle includes a vehicle floor, a plurality of bushings coupled to the vehicle floor, and a modular passenger seat system coupled to the vehicle floor through at least one of the plurality of bushings. The modular passenger seat system includes a passenger seat having a seat leg with a distal end portion. The distal end portion includes a tube configured to be received in a first bushing of the plurality of bushings. The tube includes a sidewall having a first aperture and a second aperture. The modular passenger seat system further includes a first detent member and a second detent member disposed within the first aperture and the second aperture in the sidewall of the tube. Each of the first detent member and the second detent member is configured to extend through a respective one of the first aperture and the second aperture and contact a lower portion of a first bushing of the plurality of bushings when the tube is received within the first bushing to retain the tube therein to secure the passenger seat to the vehicle floor. The modular passenger seat system further includes a biasing member disposed within the tube and a shaft movably disposed within the seat leg. The shaft has a lower end which when displaced against the biasing member enables the first detent member and the second detent member to retract inwardly into the tube to permit release of the tube from the bushing to enable removal of the passenger seat.

The passenger seat may be referred to as a first passenger seat, and the vehicle may further include a second passenger seat. The vehicle further may include a partition disposed between the first passenger seat and the second passenger seat to minimize fluid flow between the first passenger seat and the second passenger seat. The partition includes a partition leg with a lower partition portion. The lower partition portion includes a partition tube configured to be received through the vehicle floor. The partition tube includes a partition leg sidewall having a first-partition aperture and a second-partition aperture. The partition further includes a first-partition detent member and a second-partition detent member disposed within the first-partition aperture and the second-partition aperture in the partition leg sidewall of the partition tube. Each of the first-partition detent member and the second-partition detent member is configured to extend through a respective one of the first-partition aperture and the second-partition aperture and contact a lower portion of a second bushing of the plurality of bushings when the partition tube is received within the second bushing to retain the tube therein to secure the partition to the vehicle floor. The partition further includes a partition biasing member disposed within the partition tube and a partition shaft movably disposed within the partition leg. The partition shaft has a lower partition-shaft end which when displaced against the partition biasing member enables the first-partition detent member and the second-partition detent member to retract inwardly into the tube to permit release of the tube from the second bushing to enable removal of the partition.

The partition may further include a transparent panel supported by the partition leg. The transparent panel is disposed between the first passenger seat and the second passenger seat to minimize fluid flow between the first passenger seat and the second passenger seat while allowing light to pass between the first passenger seat and the second passenger seat through the transparent panel. The vehicle may be an airplane.

The present disclosure also describes a method of installing a modular passenger seat system into a vehicle floor. The method includes depressing a depressible button of a passenger seat. The passenger seat includes a seat leg with a distal end portion. The distal end portion includes a tube configured to be received in a bushing coupled to the vehicle floor. The tube includes a sidewall having a first aperture and a second aperture. The modular passenger seat system further includes a first detent member and a second detent member disposed within the first aperture and the second aperture in the sidewall of the tube. Each of the first detent member and the second detent member is configured to extend through a respective one of the first aperture and the second aperture and contact a lower portion of the bushing when the tube is received within the bushing to retain the tube. The modular passenger seat system further includes a biasing member disposed within the tube. The modular passenger seat system includes a shaft movably disposed within the seat leg. The shaft has a lower end which when displaced against the biasing member enables the first detent member and the second detent member to retract inwardly into the tube. The depressible button is coupled to an upper end of the shaft, and depressing the depressible button enables each of the first detent member and the second detent member to retract inwardly into the tube.

The method further includes inserting the seat leg of the passenger seat into the bushing coupled to the vehicle floor while, at the same time, depressing the depressible button of the passenger seat. In addition, the method includes releasing the depressible button to lock the seat leg to the bushing after inserting the seat leg of the passenger seat into the bushing to allow the first detent member and the second detent member to move outwardly through the first aperture and the second aperture, respectively, to firmly secure the passenger seat to the vehicle floor.

The method may further include unlocking a lock coupled to the depressible button before depressing the depressible button. The lock has an unlocked state and a locked state. The lock is configured to prevent the depressible button from being depressed when the lock is in the locked state. The lock is configured to allow the depressible button to be depressed when the lock is in the unlocked state. The method may further include inserting a key into the lock and turning the key after the key is inserted into the lock to move the lock from the locked state to the unlocked state to allow the depressible button to be depressed. The depressible button may be depressed after moving the lock to the unlocked state to cause the shaft to be displaced relative to the tube.

The above features and advantages and other features and advantages of the present teachings are readily apparent from the following detailed description of the modes for carrying out the present teachings when taken in connection with the accompanying drawings.

BRIEF DESCRIPTION OF THE DRAWINGS

The accompanying drawings, which are incorporated into and constitute a part of this specification, illustrate implementations of the disclosure and together with the description, serve to explain the principles of the disclosure.

FIG. 5 is a schematic, side view of the passenger seat of FIG. 1, wherein the seat leg is secured to the vehicle floor.

FIG. 6 is a schematic, side view of the passenger seat of FIG. 1, wherein the seat leg is not secured to the vehicle floor.

FIG. 10 is a schematic, cross-sectional view of a distal end portion of a seat leg of the passenger seat in accordance with another aspect of the present disclosure, wherein the distal end portion includes a tube and a shaft inside the tube, and the shaft is secured to the tube.

FIG. 11 is a schematic, cross-sectional view of the distal end portion of the seat leg of the passenger seat of FIG. 10, wherein the shaft is not secured to the tube.

DETAILED DESCRIPTION

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Figure 1:
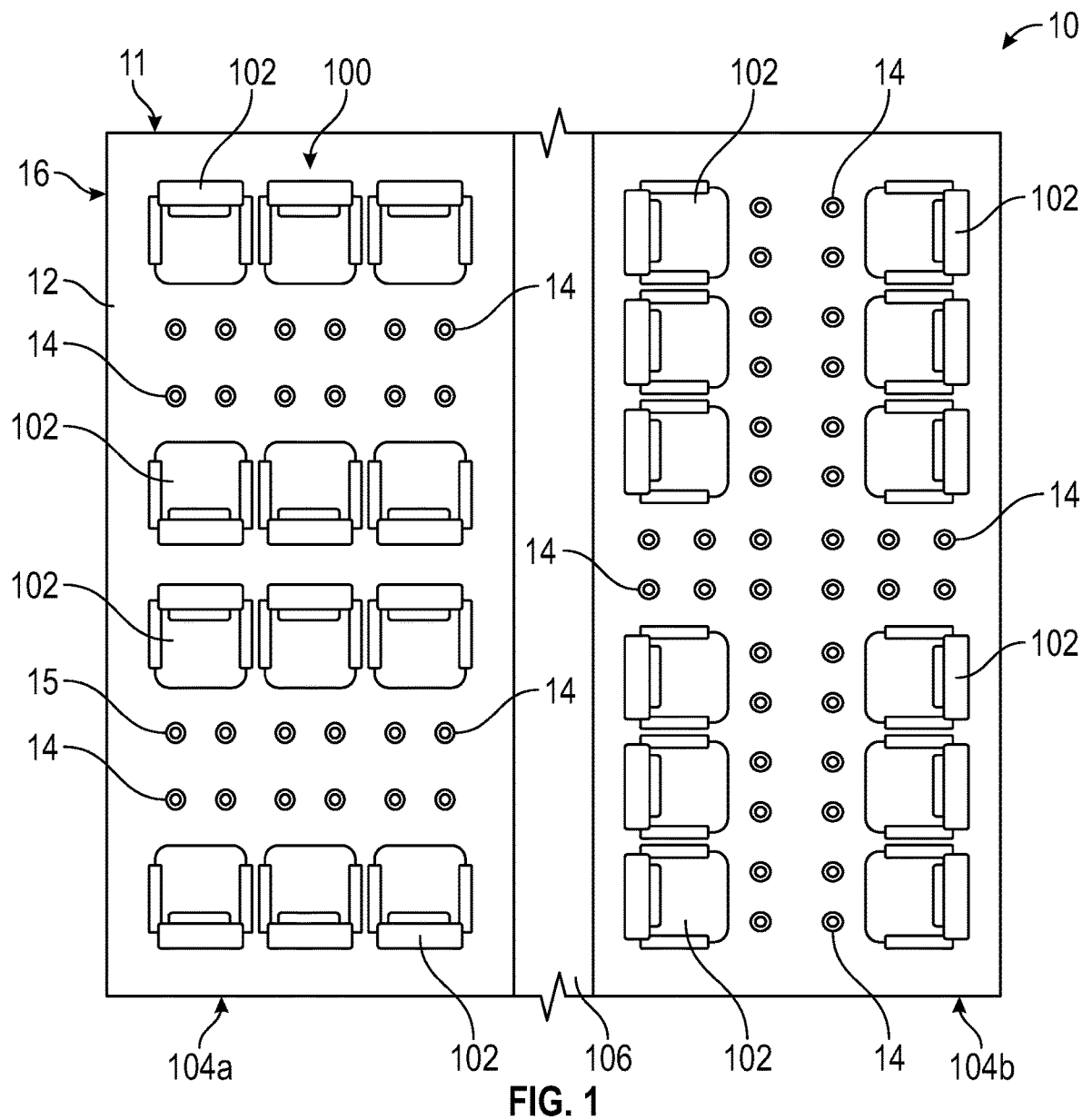
FIG. 1 is a schematic, top view of a vehicle including a modular passenger seat system coupled to a vehicle floor.

With reference to FIG. 1, a vehicle 10 includes a vehicle floor 12 and one or more bushings 14 coupled to the vehicle floor 12. The vehicle 10 may be, for example, an aircraft 11 or a bus. In the depicted embodiment, the bushings 14 are directly coupled to the vehicle floor 12. Each bushing 14 has a hole 15. If the vehicle 10 is an aircraft 11, the vehicle floor 12 is an aircraft floor located inside a fuselage 16 of the aircraft 11. It is contemplated, however, that the vehicle 10 may be another kind of vehicle capable of transporting passengers, such as a boat or a spacecraft. Regardless of the kind of vehicle 10, the vehicle 10 includes a modular passenger seat system 100 having one or more passenger seats 102. The modular passenger seat system 100 is coupled to the vehicle floor 12 and allows the passenger seats 102 to be easily and quickly coupled and decoupled from the vehicle floor 12. As a result, the seating layout of the vehicle 10 may be quicky reconfigured, thereby saving time and cost. In the depicted embodiment, the passenger seats 102 are arranged in two seating areas 104a, 104b between an aisle 106, and the passenger seats 102 are arranged in spaced apart rows to promote social distancing. By using the modular passenger seat system 100, the seating layout shown in FIG. 1 may be quickly changed to, for example, install the passenger seats 102 closer or farther apart from one another.

Figure 2:
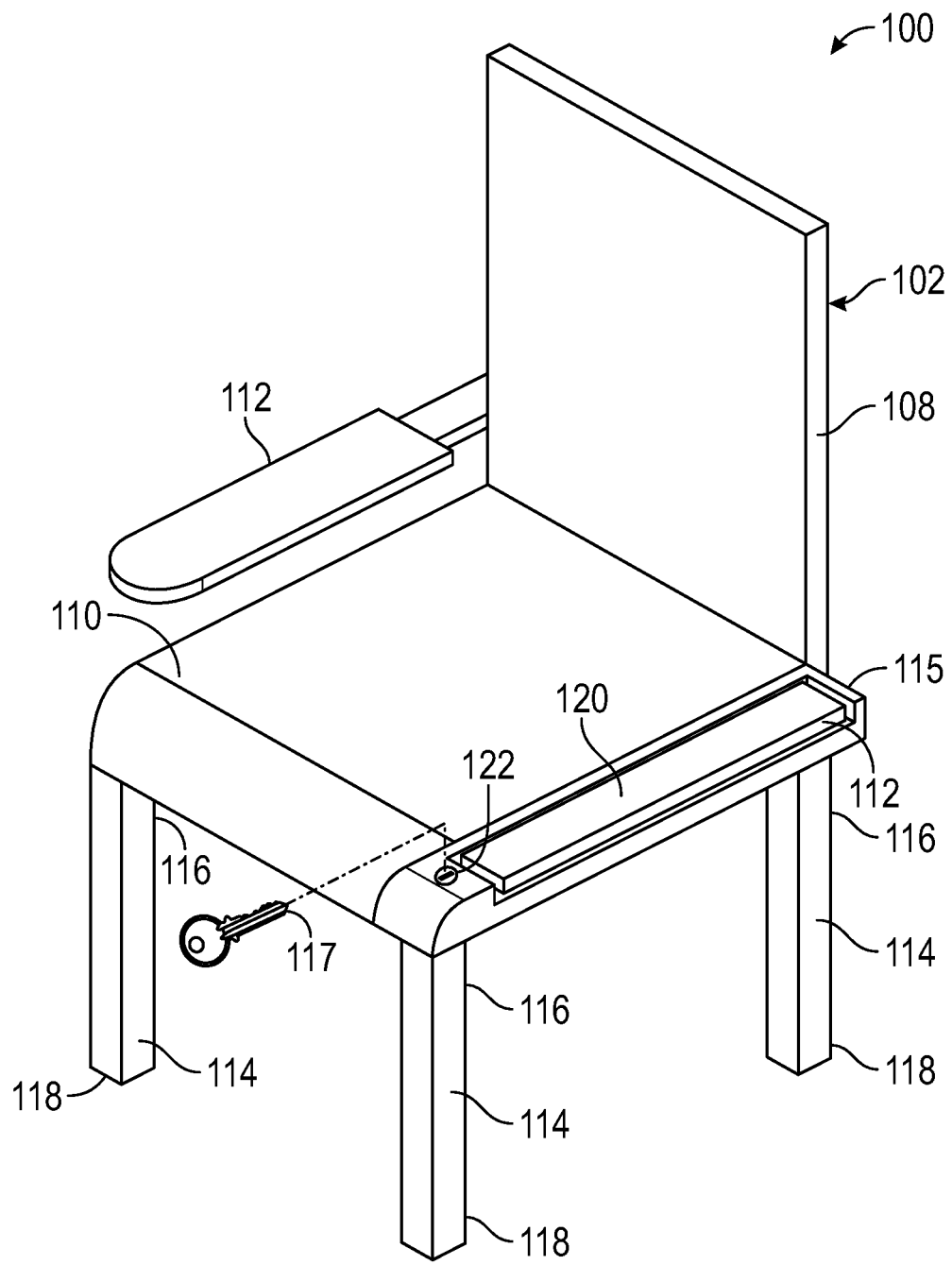
FIG. 2 is a schematic, perspective view of a passenger seat of the modular passenger seat system of FIG. 1.

With reference to FIG. 2, the modular passenger seat system 100 may include one or more passenger seats 102 as discussed above. For instance, in the depicted embodiment, the modular passenger seat system 100 includes twenty-four passenger seats 102 as shown in FIG. 1 However, it is envisioned that the modular passenger seat system 100 may include more or fewer passenger seats 102. Irrespective of the quantity, each passenger seat 102 includes a seatback 108 and a seat base 110 coupled to the seatback 108. Each passenger seat 102 may further include one or more armrests 112 coupled to the seatback 108. At least a portion of one of the armrests 112 may be movable as discussed below. At least one of the armrests 112 includes an armrest body 115 and a depressible button 120 movable relative to the armrest body 115. As discussed in detail below, depressing the depressible button 120 relative to the armrest body 115 allows the passenger seat 102 to be decoupled from the vehicle floor 12 (FIG. 1). The passenger seat 102 may further include a lock 122 disposed at the armrest 112. The lock 122 is coupled to the depressible button 120 and has an unlocked state and a locked state. A key 117 may be inserted in the lock 122 to switch the lock 122 between the locked state and the unlocked state. When the lock 122 is in the locked state, the lock 122 prevents the depressible button 120 from being depressed. When the lock 122 is in the unlocked state, the lock 122 allows the depressible button 120 to be depressed relative to the armrest body 115 of the armrest 112.

In addition to the armrests 112, each passenger seat 102 includes a plurality of seat legs 114 coupled to the seat base 110 to support a passenger seated on the passenger seat 102. Each seat leg 114 has a proximal end portion 116 and a distal end portion 118 opposite the proximal end portion 116. The proximal end portion 116 is attached to the seat base 110, whereas the distal end portion 118 is configured to be coupled to one of the bushings 14 (FIG. 1).

Figure 3:
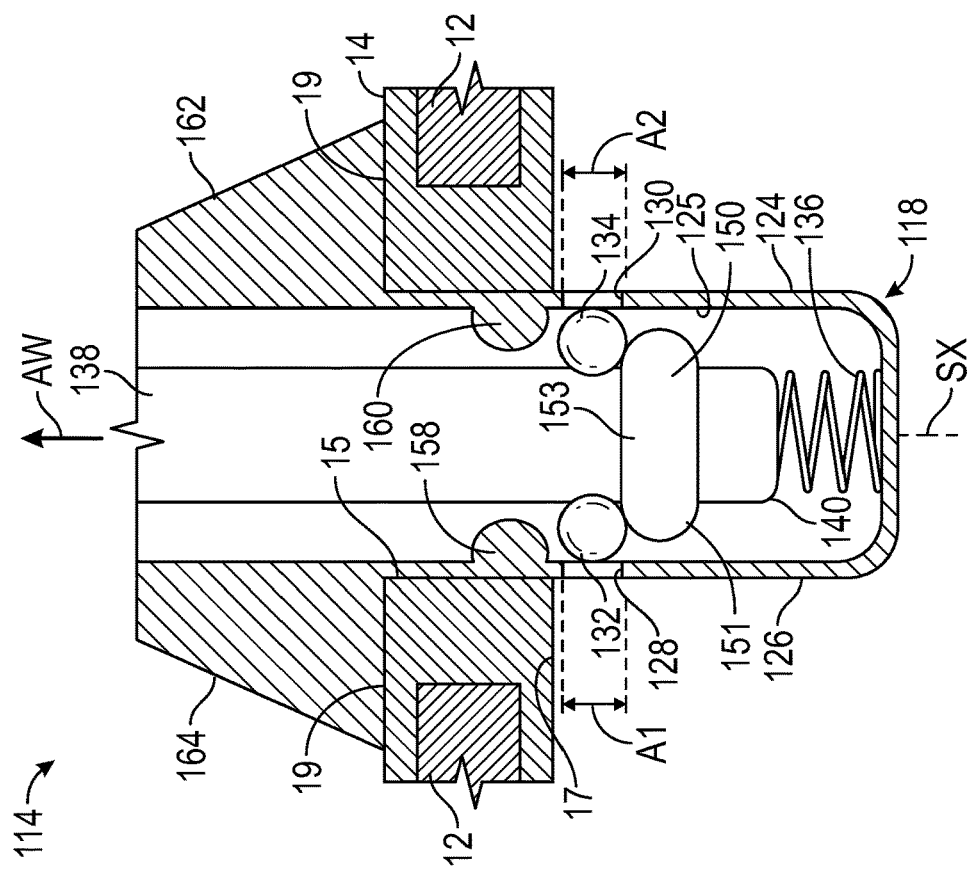
FIG. 3 is a schematic, cross-sectional view of a distal end portion of a seat leg of the passenger seat of FIG. 2, wherein the distal end portion includes a tube and a shaft inside the tube, and the shaft is secured to the tube.
Figure 4:
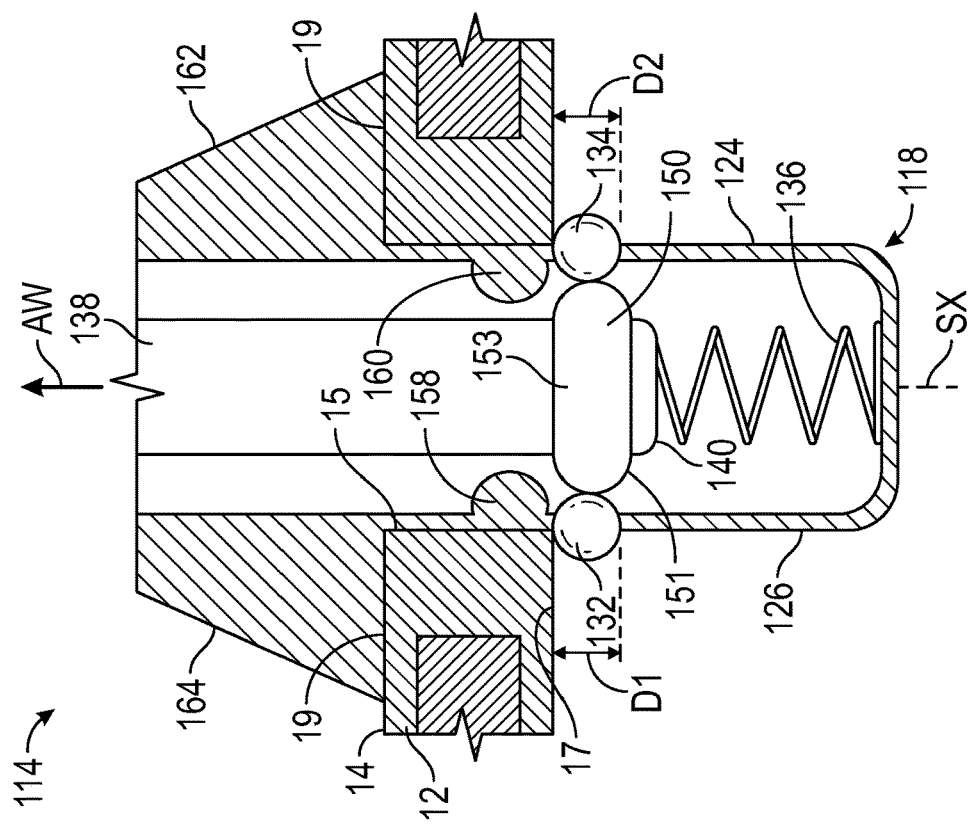
FIG. 4 is a schematic, cross-sectional view of the distal end portion of the seat leg of the passenger seat of FIG. 2, wherein the shaft is not secured to the tube.
Figure 8:
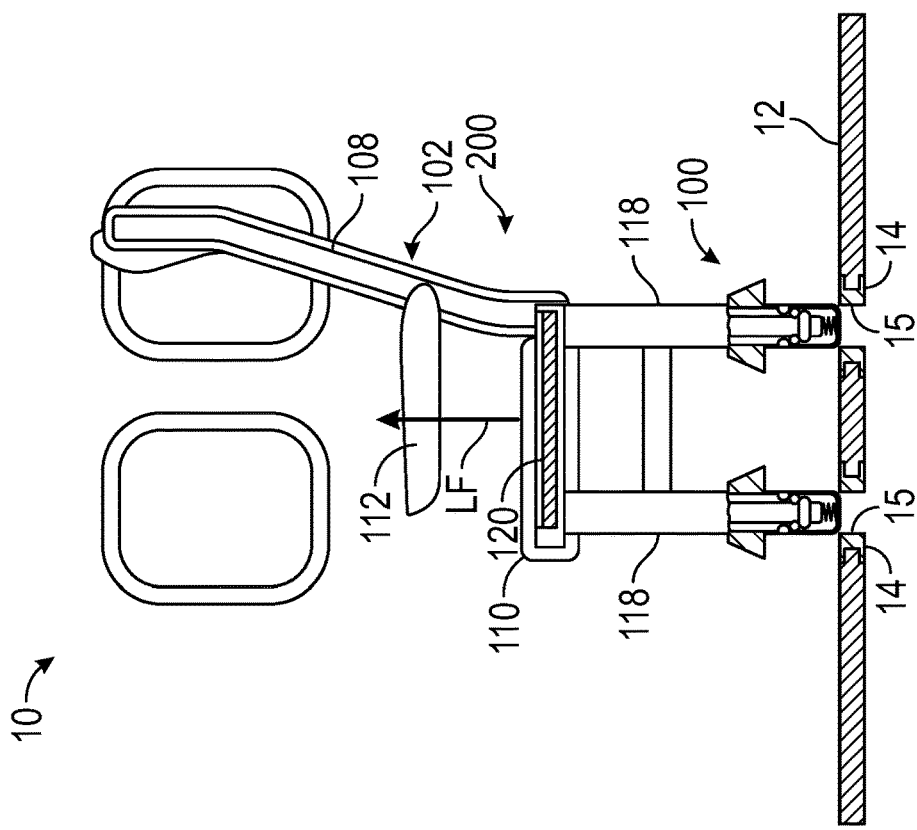
FIG. 8 is a schematic, side view of the vehicle of FIG. 1, depicting the passenger seat being removed from a bushing in the vehicle floor.
Figure 7:
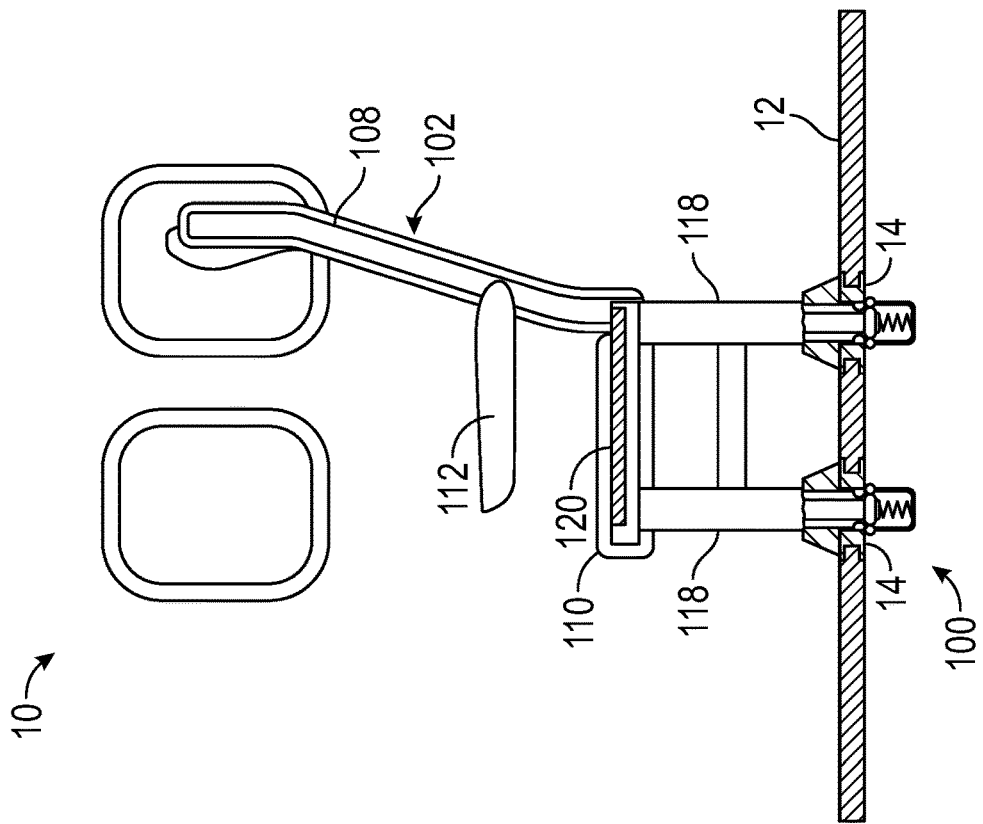
FIG. 7 is a schematic, side view of the vehicle of FIG. 1, wherein the passenger seat is secured to the vehicle floor.

With reference to FIGS. 3 and 4, the distal end portion 118 of the seat leg 114 includes a tube 124. As used herein, the term "tube" means a hollow body. Accordingly, the tube 124 defines a tube cavity 125. While the tube 124 may have a cylindrical shape, it may alternatively have other suitable shapes so long as it is a hollow body. Regardless of its specific shape, the tube 124 is configured, shaped, and sized to be received in the hole 15 of one of the bushings 14 of the vehicle floor 12 (FIG. 1). The tube 124 includes a sidewall 126 surrounding the tube cavity 125. The tube 124 further includes a first aperture 128 and a second aperture 130 extending through the sidewall 126. Thus, each of the first aperture 128 and the second aperture 130 is in communication with the tube cavity 125. Further, the first aperture 128 and the second aperture 130 may be disposed on opposite sides of the tube 124 to equally distribute loads. The first aperture 128 has a first maximum cross-sectional dimension A1 (e.g., a diameter), and the second aperture 130 has a second maximum cross-sectional aperture dimension A2 (e.g., diameter).

The modular passenger seat system 100 further includes a first detent member 132 and a second detent member 134 at least partially disposed inside the tube cavity 125 of the tube 124. When the seat leg 114 is secured to the bushing 14, the first detent member 132 and the second detent member 134 are at least partially disposed in the first aperture 128 and the second aperture 130, respectively. In particular, the first detent member 132 is configured to extend partially through the first aperture 128 in the sidewall 126, and the second detent member 134 is configured to extent partially through the second aperture 130 in the sidewall 126. However, the first detent member 132 cannot pass entirely through the first aperture 128, and the second detent member 134 cannot pass entirely through the second aperture 130. For this reason, the first maximum cross-sectional aperture dimension A1 of the first aperture 128 is less than a first maximum cross-sectional detent dimension D1 (e.g., diameter) of the first detent member 132, and the second maximum cross-sectional aperture dimension A2 is less than a maximum cross-sectional detent dimension D2 (e.g., diameter) of the second detent member 134. When the seat leg 114 is secured to the bushing 14, the first detent member 132 (which partially extends through the first aperture 128) and the second detent member 134 (which partially extends through the second aperture 130) may directly contact a lower portion 17 of the bushing 14 when the tube 124 is received within the hole 15 of the bushing 14 to retain the tube 124 inside the bushing 14, thereby securing the passenger seat 102 to the vehicle floor 12. The first detent member 132 and the second detent member 134 may be shaped as detent balls to facilitate manufacturing. However, the first detent member 132 and the second detent member 134 may have other shapes suitable to help retain the seat leg 114 within the bushing 14.

The modular passenger seat system 100 further includes a biasing member 136, such as a coil spring, disposed inside the tube 124 and a shaft 138 coupled to the biasing member 136. The shaft 138 is movably disposed within the tube 124 of the seat leg 114 and may be in direct contact with the biasing member 136. Consequently, the biasing member 136 biases the shaft 138 in a direction AW away from the distal end portion 118 and toward the proximal end portion 116 of the seat leg 114. The shaft 138 has a lower end 140 in direct contact with the biasing member 136. When the lower end 140 of the shaft 138 is displaced against the biasing member 136, the shaft 138 enables the first detent member 132 and the second detent member 134 to retract inwardly into the tube 124 to permit release of the tube 124 from the bushing 14, thereby enabling removable of the passenger seat 102 from the vehicle floor 12.

The modular passenger seat system 100 further includes a retention member (i.e., the first retention element 150) disposed around the shaft 138. The shaft 138 is elongated along a shaft axis SX and, therefore, the first retention element 150 is disposed around the shaft axis SX. The first retention element 150 is fixed to the shaft 138. As such, the shaft 138 moves in unison with the first retention element 150. The first retention element 150 includes a retention body 153 disposed around the shaft 138 relative to each of the first detent member 132 and the second detent member 134 to displace the first detent member 132 and the second detent member 134 outwardly relative to the tube 124 and into the first aperture 128 and the second aperture 130, respectively, upon release of the depressible button 120 to thereby secure the seat leg 114 to the bushing 14. As a non-limiting example, the retention body 153 may have a toroidal shape to urge the first detention member 132 and the second detent member 134 outwardly through the first aperture 128 and the second aperture 130, respectively, as the biasing member 136 biases the shaft 138 in the direction AW away from the distal end portion 118 and toward the proximal end portion 116 of the seat leg 114.

The first retention element 150 has a curved outermost surface 151 to allow the first detent member 132 and the second detent member 134 to rotate along the first retention element 150 while the shaft 138 moves between a secured position (FIG. 3) and a released position (FIG. 4), thereby facilitating a smooth transition of the modular passenger seat system 100 between the secured position and the released position. Specifically, when the shaft 138 is in the secured position (FIG. 3), the first retention element 150 is positioned to contact the first detent member 132 and the second detent member 134 to maintain the first detent member 132 and the second detent member 134 partially disposed in the first aperture 128 and the second aperture 130, respectively. Conversely, when the shaft 138 is in the released position (FIG. 4), the first retention element 150 is positioned to allow the first detent member 132 and the second detent member 134 to be entirely disposed inside the tube 124, allowing the seat leg 114 to be removed from the hole 15 of the bushing 14.

The modular passenger seat system 100 further includes a first mechanical stop 158 and a second mechanical stop 160 each protruding inwardly toward the shaft 138 from the sidewall 126. The first mechanical stop 158 and the second mechanical stop 160 are disposed above the first aperture 128 and the second aperture 130, respectively, to prevent the first detent member 132 and the second detent member 134 from moving upward past the first aperture 128 and the second aperture 130. As a consequence, the first mechanical stop 158 and the second mechanical stop 160 force the first detent member 132 and the second detent member 134, respectively, to move outwardly into the first aperture 128 and the second aperture 130 as the shaft 138 moves upward in the direction AW.

The modular passenger seat system 100 may additionally include holding members 162 and 164 extending outwardly from the tube 124. Each of the holding members 162 and 164 contacts an upper portion 19 of bushing 14 to hold the seat leg 114 against the bushing 14. As a non-limiting example, each of the holding members 162 and 164 may be configured as a wedge to maximize the area in contact with the upper portion 19 of the bushing 14 while minimizing costs.

FIGS. 5-8 illustrate a method for installing or uninstalling the modular passenger seat system 100. The modular passenger seat system 100 includes the depressible button 120. The depressible button 120 is disposed relative to an upper end 139 of the shaft 138. The lock 122 is configured to lock the depressible button 120 and may include a lock rotatable body 121 configured to rotate about a rotation axis RX. The lock 122 further includes a locking protrusion 123 extending from the lock rotatable body 121. Upon rotation of the lock rotatable body 121, the locking protrusion 123 moves between a locked position (FIG. 5) and an unlocked position (FIG. 6). When disposed in the locked position, the locking protrusion 123 is disposed below the depressible button 120, thereby preventing the depressible button 120 from being depressed in the direction DP. When disposed in the unlocked position, the locking protrusion 123 is not disposed below the depressible button 120 and, therefore, does not impede the movement of the depressible button 120 in the direction DP.

When the lock 122 is in the unlocked state and the depressible button 120 is depressed in the direction indicated by arrow DP (as shown in FIG. 6), the depressible button 120 displaces the first retention element 150 on the shaft 138 to enable each of the first detent member 132 and the second detent member 134 to retract inwardly into the tube 124 to permit release of the tube 124 from the bushing 14. Then, while maintaining the depressible button 120 depressed, the passenger seat 102 is lifted (in the direction indicated by arrow LF) to remove the passenger seat 102 from the vehicle floor 12.

To install the passenger seat 102 to the vehicle floor 12, the key 117 (FIG. 2) is inserted in the lock 122 and then rotated about the rotation axis RX to rotate the lock rotatable body 121. As a consequence, the locking protrusion 123 moves from the locked position to the unlocked position. In other words, the lock 122 is unlocked. After moving the lock 122 to the unlocked state, the depressible button 120 is depressed (in the direction indicated by arrow DP) to enable each of the first detent member 132 and the second detent member 134 to retract inwardly into the tube 124 to permit release of the tube 124 from the bushing 14. While maintaining the depressible button 120 depressed, the seat leg 114 of the passenger seat 102 is inserted into the hole 15 of the bushing 14 that is coupled to the vehicle floor 12. In other words, the seat leg 114 of the passenger seat 102 is inserted into the bushing 14 while, at the same time, depressing the depressible button 120 of the passenger seat 102. After inserting the seat leg 114 of the passenger seat 102 into the bushing 14, the depressible button 120 is released to allow the first detent member 132 and the second detent member 134 to move outwardly through the first aperture 128 and the second aperture 130, respectively, to firmly secure the passenger seat 102 to the vehicle floor 12.

Figure 9:
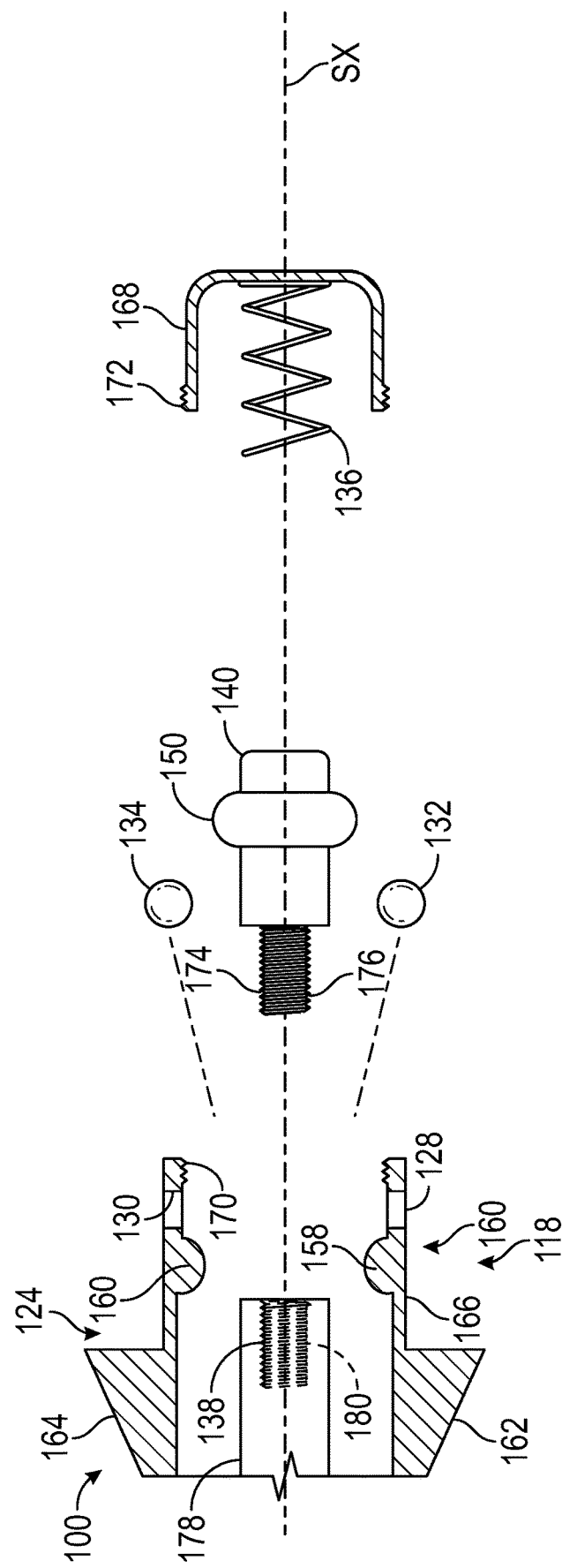
FIG. 9 is a schematic, exploded sectional view of the distal end portion of the seat leg shown in FIG. 4.

With reference to FIG. 9, the seat leg 114 may include a mechanism to facilitate assembly. For example, the tube 124 has a main tube portion 166 and a lower tube portion 168 removably coupled to the main tube portion 166. The main tube portion 166 includes internal tube threads 170. The lower tube portion 168 includes external tube threads 172 that threadedly engage the internal tube threads 170 to removably couple the lower tube portion 168 to the main tube portion 166. The lower end 140 of the shaft 138 includes a threaded protrusion 174. The threaded protrusion 174 includes external shaft threads 176. The shaft 138 includes a main shaft portion 178 removably coupled to the lower end 140 of the shaft 138. The main shaft portion 178 includes internal shaft threads 180 that threadedly engage the external shaft threads to removably coupled the lower end 140 of the shaft 138 to the main shaft portion 178 of the shaft 138.

With reference to FIGS. 10-13, the structure and operation of the modular passenger seat system 200 is substantially similar or identical to the structure and operation of the modular passenger seat system 100, except for the features described below. The modular passenger seat system 200 may not include holding members 162, 164. Instead, the tube 124 may further include a third aperture 142 and a fourth aperture 144 extending through the sidewall 126 of the tube 124. The modular passenger seat system 200 further includes a third detent member 146 and a fourth detent member 148. The third detent member 146 and the fourth detent member 148 may be configured as detent balls to minimize space. When the seat leg 114 is secured to the bushing 14, the third detent member 146 and the fourth detent member 148 are at least partially disposed in the third aperture 142 and the fourth aperture 144, respectively. In particular, the third detent member 146 is configured to extend partially through the third aperture 142 in the sidewall 126, and the fourth detent member 148 is configured to extent partially through the fourth aperture 144 in the sidewall 126. However, the third detent member 146 cannot pass entirely through the third aperture 142, and the fourth detent member 148 cannot pass entirely through the fourth aperture 144. For this reason, the third maximum cross-sectional aperture dimension A3 of the third aperture 142 is less than a third maximum cross-sectional detent dimension D3 (e.g., diameter) of the third detent member 146, and the fourth maximum cross-sectional aperture dimension A4 is less than a fourth maximum cross-sectional detent dimension D4 (e.g., diameter) of the fourth detent member 148. When the seat leg 114 is secured to the bushing 14, the third detent member 146 (which partially extends through the third aperture 142) and the fourth detent member 148 (which partially extends through the fourth aperture 144) may directly contact the upper portion 19 of the bushing 14 when the tube 124 is received within the hole 15 of the bushing 14 to retain the tube 124 inside the bushing 14, thereby securing the passenger seat 102 to the vehicle floor 12. The third detent member 146 and the fourth detent member 148 may be shaped as detent balls to facilitate manufacturing and minimize space. However, the third detent member 146 and the fourth detent member 148 may have other shapes suitable to help retain the seat leg 114 within the bushing 14.

The modular passenger seat system 100 further includes one or more retention elements (e.g., a first retention element 150 and a second retention element 152) disposed around the shaft 138. For example, the modular passenger seat system 100 may include the first retention element 150 and the second retention element 152 each disposed around the shaft 138. The first retention element 150 is spaced apart from the second retention element 152 along a shaft axis SX. The shaft 138 is elongated along the shaft axis SX. Each of the first retention element 150 and the second retention element 152 is fixed to the shaft 138. As such, the shaft 138 moves in unison with the first retention element 150 and the second retention element 152. Each of the first retention element 150 and the second retention element 152 may be configured as toroidal bodies to urge the first detent member 132, the second detent member 134, the third detent member 146, and the fourth detent member 148 outwardly through the first aperture 128, the second aperture 130, the third aperture 142, and the fourth aperture 144, respectively, as the biasing member 136 biases the shaft 138 in the direction AW away from the distal end portion 118 and toward the proximal end portion 116 of the seat leg 114.

Each of the first retention element 150 and the second retention element 152 has a curved outermost surface 151 to allow the first detent member 132, the second detent member 134, the third detent member 146, and the fourth detent member 148 to rotate along the first retention element 150 and the second retention element 152 while the shaft 138 moves between a secured position (FIG. 10) and a released position (FIG. 11), thereby facilitating a smooth transition of the modular passenger seat system 200 between the secured position and the released position. Specifically, when the shaft 138 is in the secured position (FIG. 10), the first retention element 150 and the second retention element 152 are positioned to contact the first detent member 132, the second detent member 134, the third detent member 146, and the fourth detent member 148 to maintain the first detent member 132, the second detent member 134, the third detent member 146, and the fourth detent member 148 partially disposed in the first aperture 128, the second aperture 130, the third aperture 142, and the fourth aperture 144. Conversely, when the shaft 138 is in the released position (FIG. 11), the first retention element 150 and the second retention element 152 are positioned to allow the first detent member 132, the second detent member 134, the third detent member 146, and the fourth detent member 148 to be entirely disposed inside the tube 124.

Figure 13:
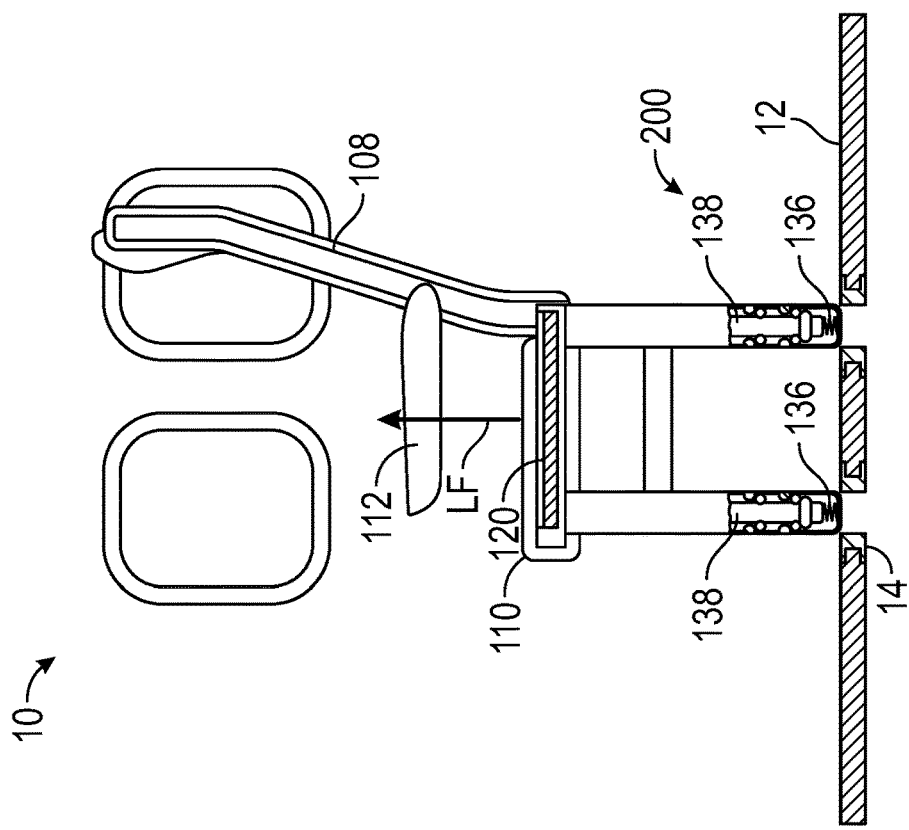
FIG. 13 is a schematic, side view of the vehicle of FIG. 10, depicting the passenger seat being removed from a bushing in the vehicle floor.
Figure 12:
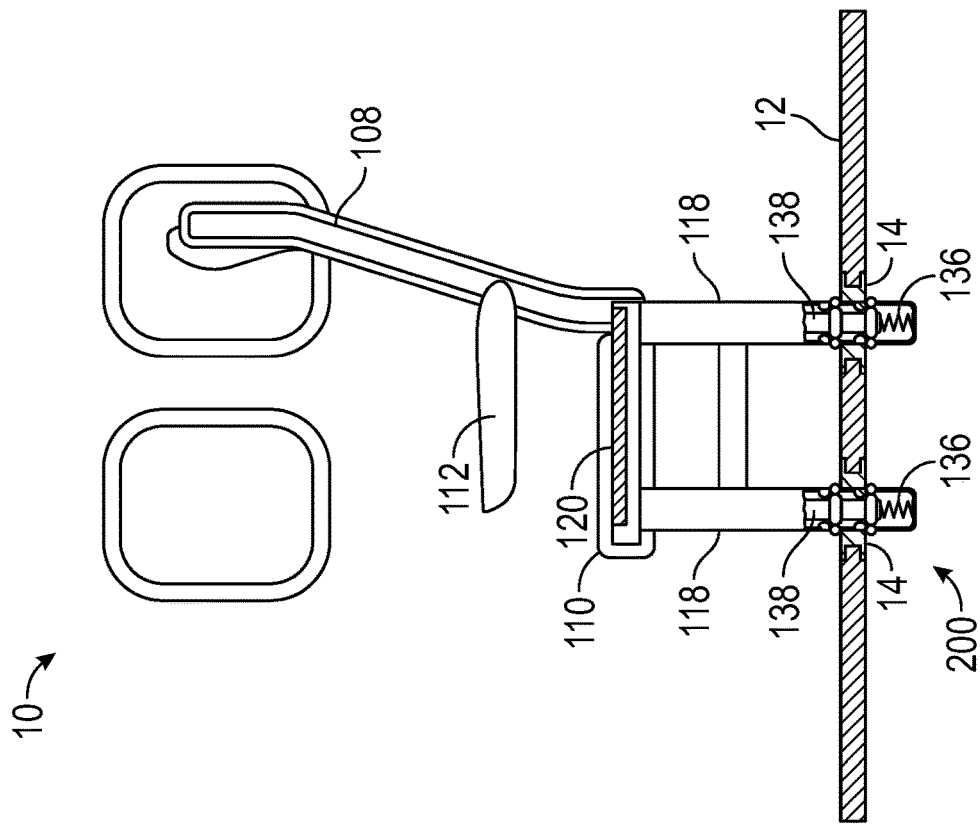
FIG. 12 is a schematic, side view of the vehicle of FIG. 10, wherein the passenger seat is secured to the vehicle floor.

The modular passenger seat system 200 further includes a third mechanical stop 159 and a fourth mechanical stop 161 each protruding inwardly toward the shaft 138 from the sidewall 126. The third mechanical stop 159 and the fourth mechanical stop 161 are disposed above the third aperture 142 and the fourth aperture 144, respectively, to prevent the third detent member 146 and the fourth detent member 148 from moving upward pass the third aperture 142 and the fourth aperture 144. As a consequence, the third mechanical stop 159 and the fourth mechanical stop 161 force the third detent member 146 and the fourth detent member 148, respectively, to move outwardly into the first aperture 128 and the second aperture 130 as the shaft 138 moves upward in the direction AW. The method for installing or uninstalling the modular passenger seat system 200 (which is shown in FIGS. 12 and 13), is substantially similar to the method described above with respect to the modular passenger seat system 100.

Figure 14:
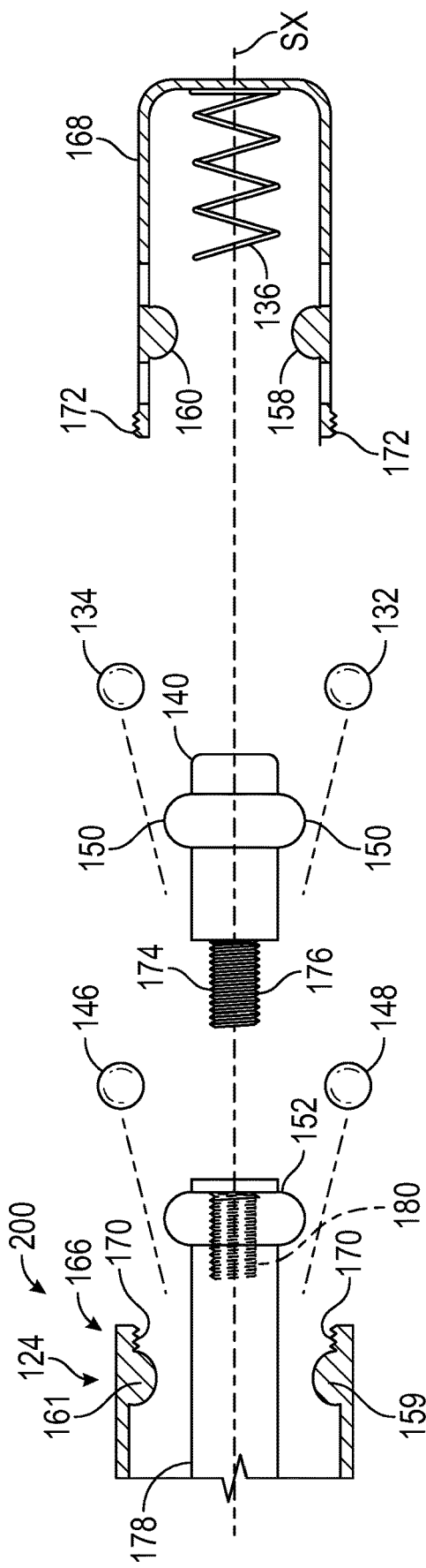
FIG. 14 is a schematic, exploded sectional view of the distal end portion of the seat leg shown in FIG. 10.
Figure 15:
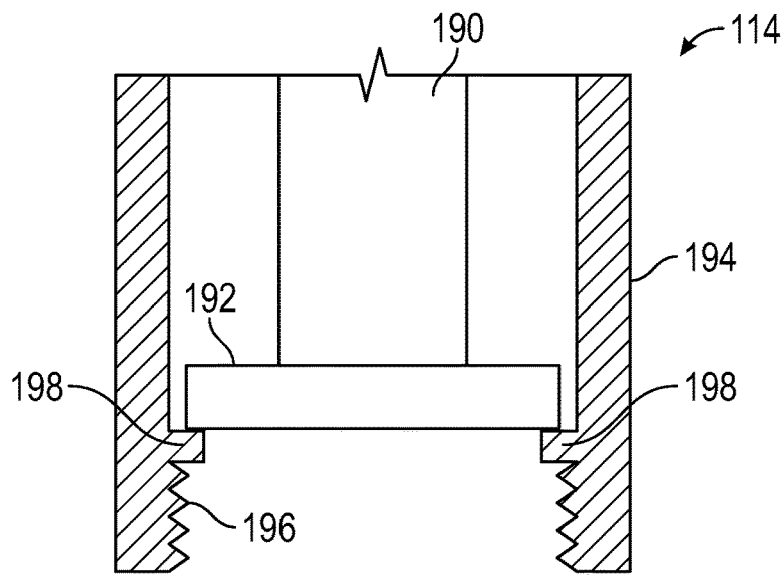
FIG. 15 is a schematic, cross-sectional view of a seat rod and a hollow body of a distal end portion of a modular passenger seat system in accordance with another aspect of the present disclosure.
Figure 16:
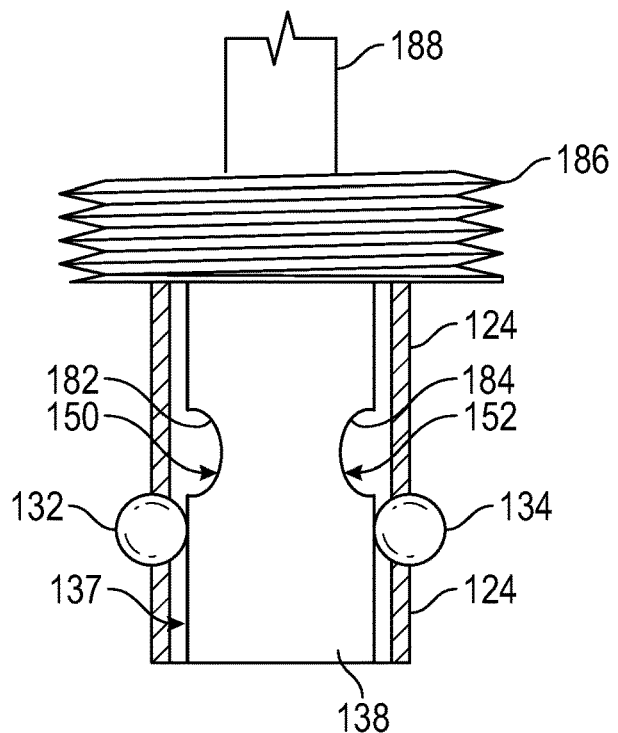
FIG. 16 is a schematic, side view of a tube, external threads, and a release pin of the modular passenger seat system of FIG. 15.
Figure 17:
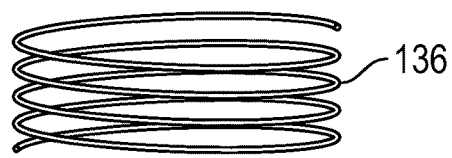
FIG. 17 is a schematic, front view of a biasing member of the modular passenger seat system of FIG. 15.
Figure 19:
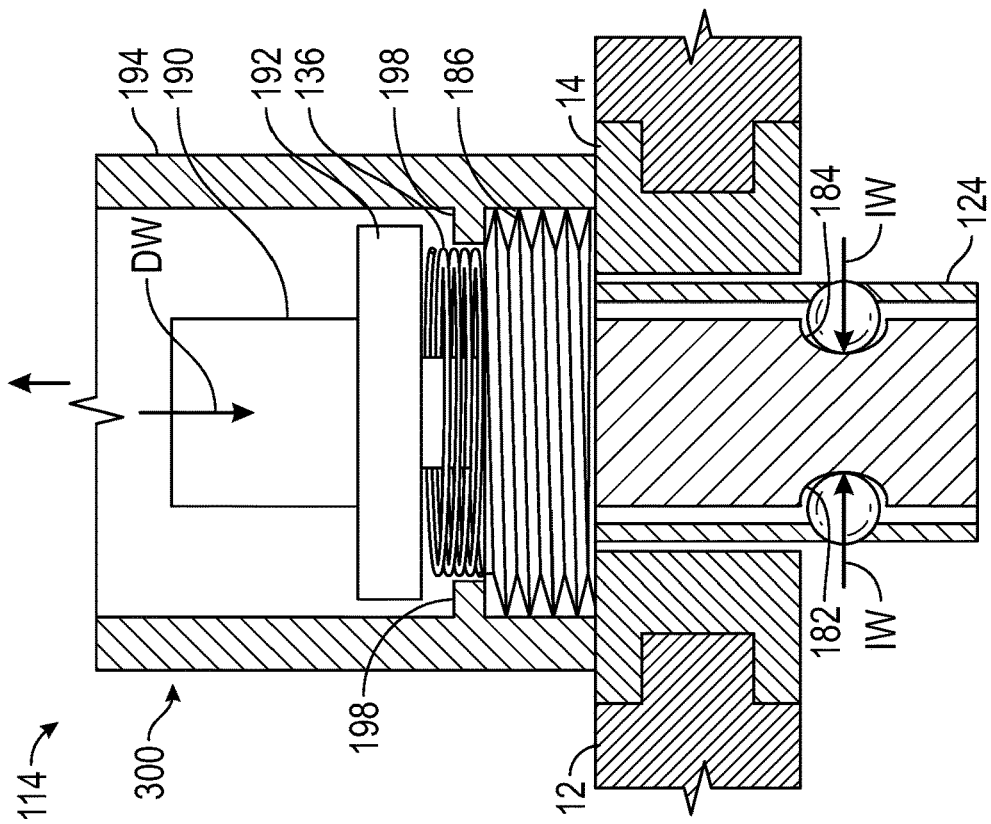
FIG. 19 a schematic, cross-sectional view of the assembled modular passenger seat system of FIG. 15, wherein the tube is not secured to the bushing of the vehicle floor.
Figure 18:
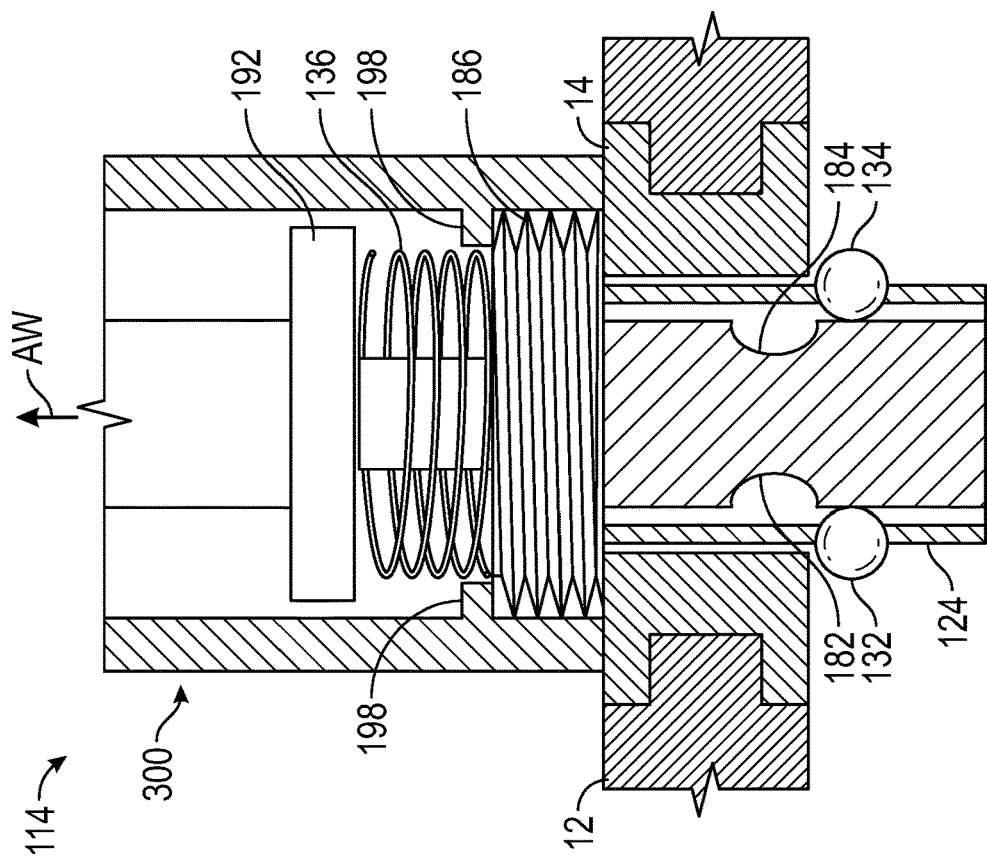
FIG. 18 is a schematic, cross-sectional view of the assembled modular passenger seat system of FIG. 15, wherein the tube is secured to the bushing of the vehicle floor.

With reference to FIG. 14, the seat leg 114 of the modular passenger seat system 200 may include a mechanism to facilitate assembly. For example, the tube 124 has a main tube portion 166 and a lower tube portion 168 removably coupled to the main tube portion 166. The main tube portion 166 includes internal tube threads 170. The lower tube portion 168 includes external tube threads 172 that threadedly engage the internal tube threads 170 to removably couple the lower tube portion 168 to the main tube portion 166. Further, the lower tube portion 168 includes the first mechanical stop 158 and the second mechanical stop 160, whereas the main tube portion 166 includes the third mechanical stop 159 and the fourth mechanical stop 161. The lower end 140 of the shaft 138 includes a threaded protrusion 174. The threaded protrusion 174 includes external shaft threads 176. The shaft 138 includes a main shaft portion 178 removably coupled to the lower end 140 of the shaft 138. The main shaft portion 178 includes internal shaft threads 180 that threadedly engage the external shaft threads 176 to be removably coupled the lower end 140 of the shaft 138 to the main shaft portion 178 of the shaft 138.

With reference to FIG. 15-19, the structure and operation of the modular passenger seat system 300 is substantially similar or identical to the structure and operation of the modular passenger seat system 100, except for the features described below. The modular passenger seat system 300 includes a first recess 182 and a second recess 184 instead of the retention bodies 153. The first retention element 150 and the second retention element 152 are configured as a first recess 182 and a second recess 184, respectively. Specifically, the shaft 138 has an outer shaft surface 137. The first retention element 150 includes a first recess 182, and the second retention element 152 includes the second recess 184. Each of the first recess 182 and the second recess 184 is formed on the outer shaft surface 137 of the shaft 138. The first recess 182 and the second recess 184 are each sized to receive the first detent member 132 and the second detent member 134, respectively.

The modular passenger seat system 300 further includes external connecting threads 186 and a release pin 188. The external connecting threads 186 are disposed between the release pin 188 and the tube 124. The seat leg 114 further includes a seat rod 190 and a flange 192 connected to the seat rod 190. The seat rod 190 and the flange 192 are entirely disposed within a leg hollow body 194. The leg hollow body 194 includes internal body threads 196 configured to threadedly engage the external connecting threads 186 to connect the leg hollow body 194 to tube 124. In addition, the leg hollow body 194 includes one or more hollow body stops 198 to limit the movement of the seat rod 190. The hollow body stops 198 are configured to contact the flange 192 to limit downward movement of the seat rod 190 relative to the leg hollow body 194. The modular passenger seat system 300 includes a biasing member 136, such as a coil spring, disposed between the flange 192 and the external connecting threads 186 to bias the seat rod 190 in the direction AW. When the depressible button 120 (FIG. 6) is depressed, the shaft 138 is displaced (in a downward direction DW) to allow the first detent member 132 and the second detent member 134 to retract inwardly (in the inward direction IW) into the first recess 182 and the second recess 184, respectively, to permit release of the tube 124 from the bushing 14 to enable removal of the passenger seat 102.

Figure 20:
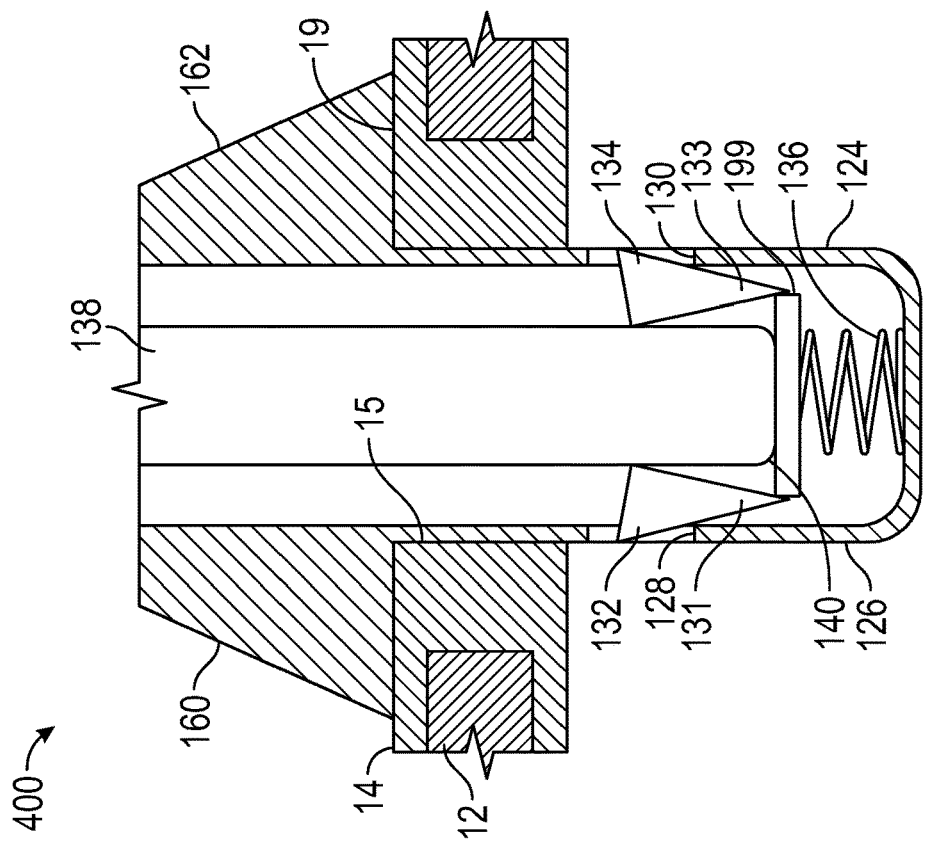
FIG. 20 is a schematic, cross-sectional view of a distal end portion of a seat leg of the passenger seat of a modular passenger seat system according to an aspect of the present disclosure, wherein the distal end portion includes a tube and a shaft inside the tube, and the shaft is secured to the tube.
Figure 21:
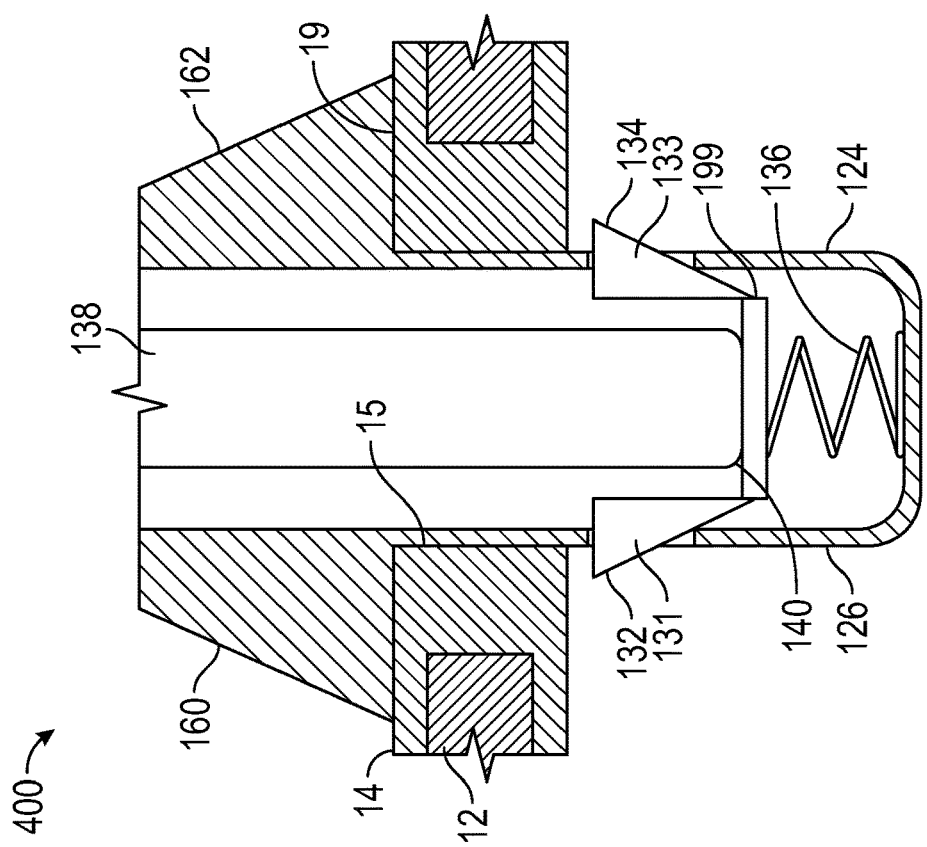
FIG. 21 is a schematic, cross-sectional view of the distal end portion of the seat leg of FIG. 20, wherein the shaft is not secured to the tube.

With reference to FIGS. 20 and 21, the structure and operation of the modular passenger seat system 400 is substantially similar or identical to the structure and operation of the modular passenger seat system 100, except for the features described below. The first detent member 132 includes a first detent leg 131 having a planar shape to minimize space while maximizing the area in contact with the bushing 14. The second detent member 134 includes a second detent leg 133 having a planar shape to minimize space while maximizing the area in contact with the bushing 14. Each of the first detent leg 131 and the second detent leg 133 is pivotally coupled to the shaft 138 to allow the first detent leg 131 and the second detent leg 133 to be displaced against the biasing member 136 to enable the first detent leg 131 and the second detent leg 133 to retract inwardly into the tube 124 from the bushing 14, thereby enabling removal of the passenger seat 102. The modular passenger seat system 400 may further include a support 199 interconnecting the shaft 138 with the first detent leg 131 and the second detent leg 133. The support 199 is attached to the lower end 140 of the shaft 138, and each of the first detent leg 131 and the second detent leg 133 is pivotally attached to the support 199.

Figure 22:
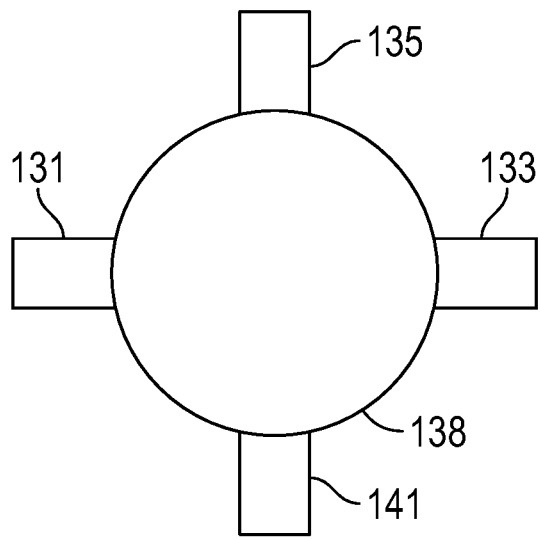
FIG. 22 is a schematic, top view of a distal end portion of a seat leg of a modular passenger seat system in accordance with another aspect of the present disclosure, wherein the modular passenger seat system includes legs pivotally coupled to a shaft, and the legs have a planar shape.
Figure 23:
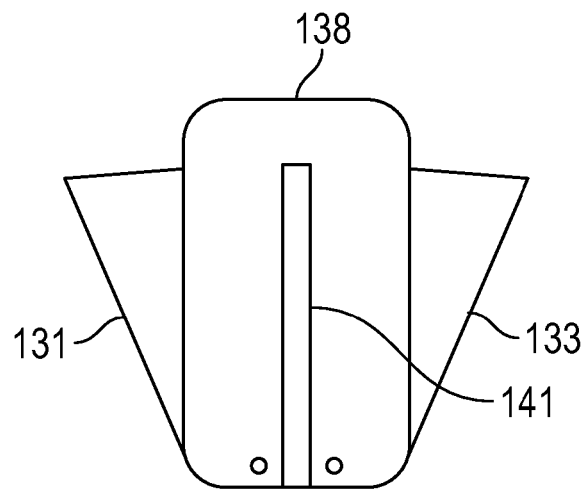
FIG. 23 is a schematic, side view of the distal end portion of the seat leg shown in FIG. 22.

With reference to FIGS. 22 and 23, the modular passenger seat system 400 may further includes a third detent leg 135 and a fourth detent leg 141 pivotally coupled to the shaft 138. The first detent leg 131, the second detent leg 133, the third detent leg 135, and the fourth detent leg 141 may be equally distanced from one another to distribute forces equally around the shaft. Further, the first detent leg 131, the second detent leg 133, the third detent leg 135, and the fourth detent leg 141 are directly and pivotally connected to the shaft 138.

Figure 24:
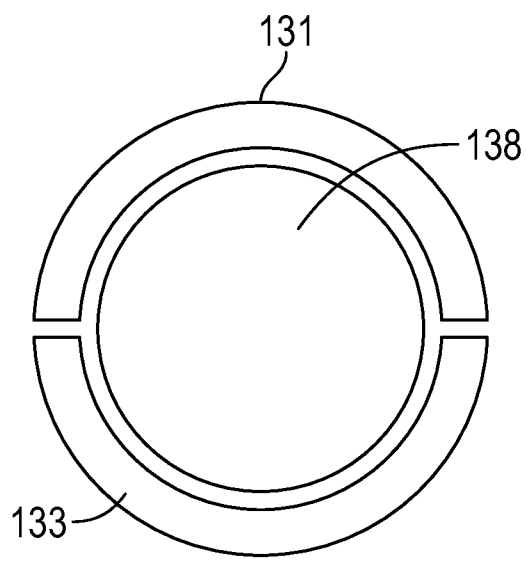
FIG. 24 is a schematic, top view of a distal end portion of a seat leg of a modular passenger seat system in accordance with another aspect of the present disclosure, wherein the modular passenger seat system includes legs pivotally coupled to a shaft, and the legs have a curved shape.
Figure 25:
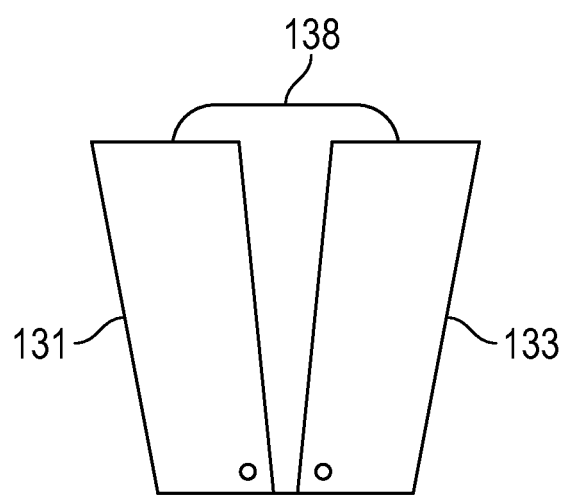
FIG. 25 is a schematic, side view of the distal end portion of the seat leg shown in FIG. 24.

With reference to FIGS. 24 and 25, the first detent leg 131 and the second detent leg 133 may be directly and pivotally coupled to the shaft 138. In addition, each of the first detent leg 131 and the second detent leg 133 may have a curved shape to partially surround the shaft 138 to minimize space.

Figure 26:
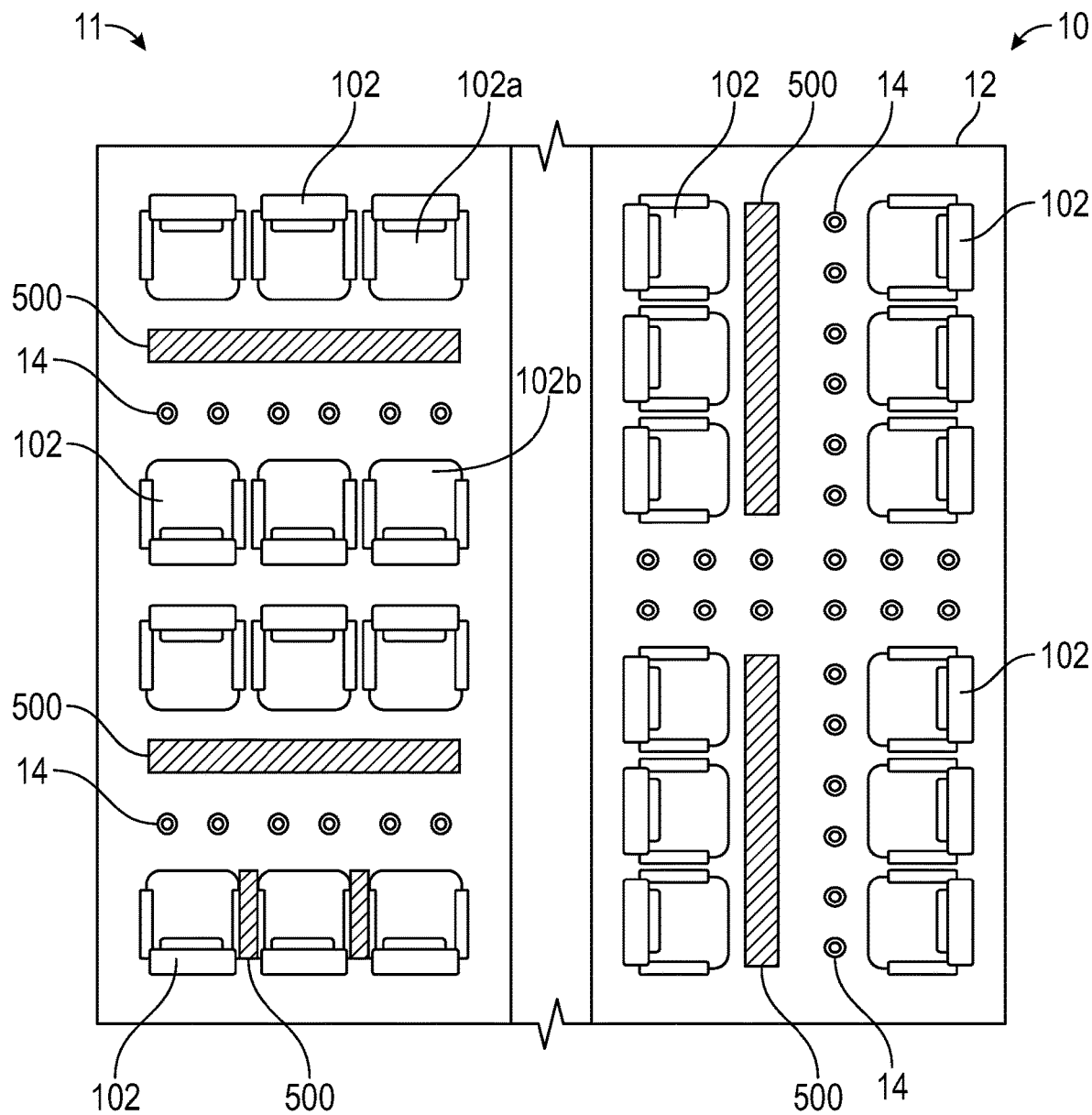
FIG. 26 is a schematic, top view of a vehicle including a plurality of partitions between passenger seats.

With reference to FIG. 26, the vehicle 10 may further include a partition 500 disposed between a first passenger seat 102a and a second passenger seat 102b to minimize fluid flow between the passengers seated on the first passenger seat 102a and the second passenger seat 102b. By minimizing fluid flow between the first passenger seat 102a and the second passenger seat 102b, it is less likely that passengers in the vehicle 10 may spread an airborne contagious disease among other passengers.

Figure 27:
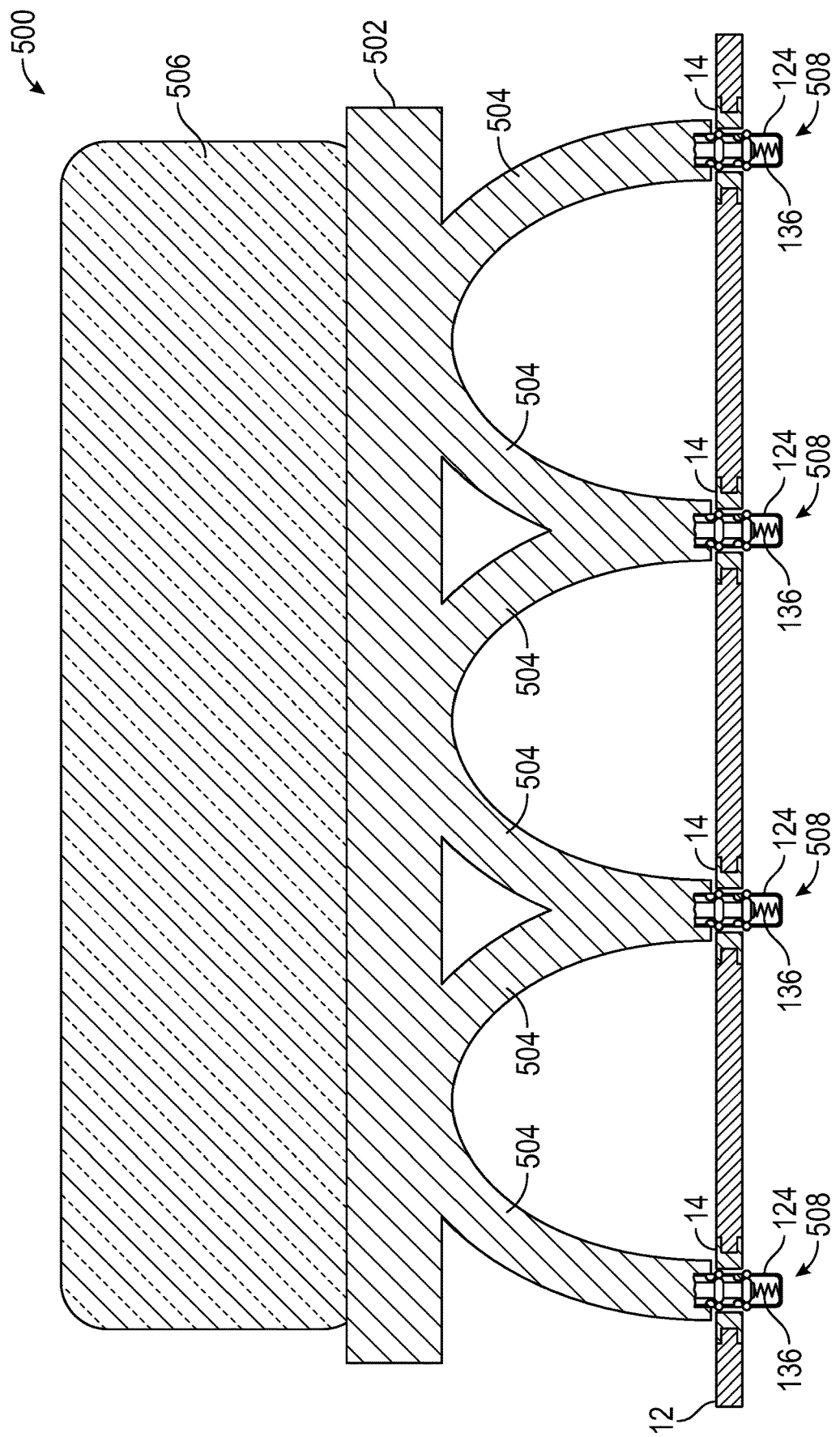
FIG. 27 is a schematic, cross-sectional side view of one of the partitions shown in FIG. 26, wherein the partition is configured to be disposed between rows of passenger seats.
Figure 28:
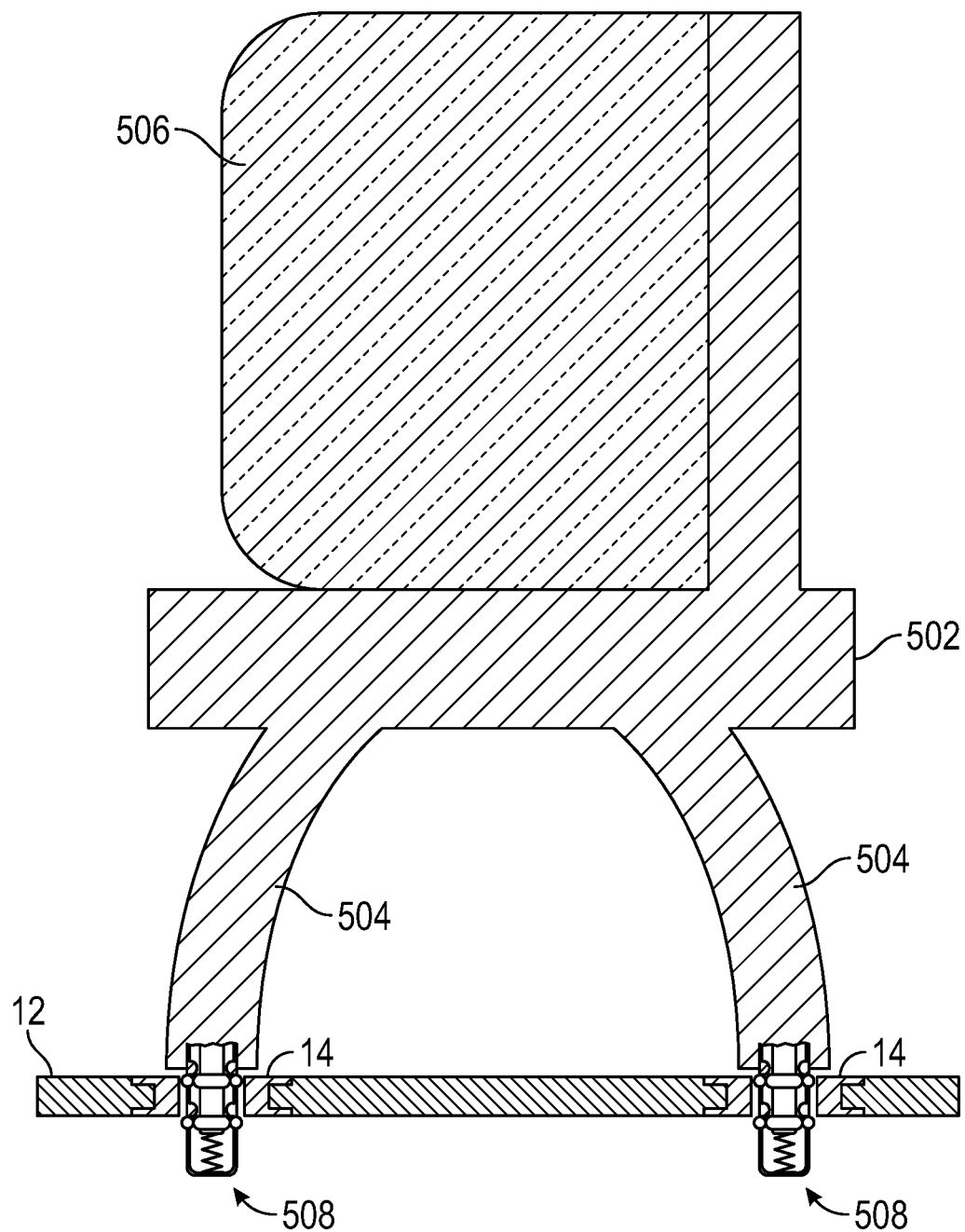
FIG. 28 is a schematic, cross-sectional side view of one of the partitions shown in FIG. 26, wherein the partition is configured to be disposed between adjacent passenger seats in the same row of passenger seats.

With reference to FIGS. 27 and 28, the partition 500 includes a partition support 502 and a plurality of partition legs 504 coupled to the partition support 502. The partition 500 further includes a transparent panel 506 supported by the partition legs 504 and the partition support 502. The transparent panel 506 may be disposed between the first passenger seat 102a and the second passenger seat 102b to minimize fluid flow between the first passenger seat 102a and the second passenger seat 102b while allowing light to pass between the first passenger seat 102a and the second passenger seat 102b through the transparent panel 506. In FIG. 27, the partition 500 includes six partition legs 504 to minimize fluid flow between the passenger seats 102 that are disposed at different rows. In FIG. 28, the partition 500 may include two partition legs 504 to minimize the fluid flow between two passenger seats 102 disposed on the same row. The partitions 500 may include the modular passenger seat system 200 (or any other modular passenger seat system described in the present disclosure) to facilitate connection to and release from the vehicle floor 12. For this reason, the partition leg 504 includes a lower partition portion 508 having the tube 124, which is configured to be received through the bushing 14 of the vehicle floor 12. In this case, the tube 124 is referred to as the partition tube. Because the partition 500 may use, for example, the elements of the modular passenger seat system 200, the elements of the partition 500 may be referred as to follows: the sidewall 126 may be referred to as the partition leg sidewall; the first aperture 128 may be referred to as the first-detention aperture; the second aperture 130 may be referred to as the second-detention aperture; the first detent member 132 may be referred to as the first-partition detent member; the second detent member 134 may be referred as the second-partition detent member; the biasing member 136 may be referred to as the partition biasing member; the shaft 138 may be referred to as the partition shaft; and the lower end 140 of the shaft 138 may be referred to as the lower partition-shaft end of the partition shaft. While the names of the elements are slightly different, the structure and operation are the same.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware that enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

What is claimed is:

1. A modular passenger seat system for a vehicle, comprising:
   a passenger seat having a seat base and a seat leg coupled to and extending outwardly from the seat base, the seat leg having a distal end portion comprising a tube configured to be received in a bushing fixed to a vehicle floor, and the tube comprises a sidewall having a first aperture and a second aperture;
   a first detent member and a second detent member disposed within the first aperture and the second aperture in the sidewall of the tube, wherein each of the first detent member and the second detent member is configured to extend through a respective one of the first aperture and the second aperture and contact a lower portion of the bushing when the tube is received within the bushing to retain the tube therein to secure the passenger seat to the vehicle floor;
   a biasing member disposed within the tube;
   a shaft having an upper end disposed proximal to the seat base and a lower end disposed proximal to the tube, and wherein the shaft extends inside of the seat leg from the upper end proximal to the seat base to the lower end proximal to the tube; and
   a depressible button coupled to the upper end of the shaft such that the depressible button is configured to move the shaft independently of the seat leg, and such movement of the shaft relative to the seat leg causes the lower end of the shaft to displace the biasing member which enables the first detent member and the second detent member to retract inwardly into the tube to permit release of the tube from the bushing to enable removal of the passenger seat from the vehicle floor.

2. The modular passenger seat system of claim 1, wherein:
the sidewall of the tube has a third aperture and a fourth aperture;
the modular passenger seat system further comprises a third detent member and a fourth detent member configured to be received within the third aperture and the fourth aperture, respectively; and
each of the third detent member and the fourth detent member is configured to extend through a respective one of the third aperture and the fourth aperture and contact an upper portion of the bushing when the tube is received within the bushing to retain the tube therein to firmly secure the passenger seat to the vehicle floor.

3. The modular passenger seat system of claim 1:
further comprising a retention element disposed around the shaft; and
wherein the depressible button is configured to displace the retention element on the shaft relative to each of the first detent member and the second detent member to enable each of the first detent member and the second detent member to retract inwardly into the tube to permit release of the tube from the bushing.

4. The modular passenger seat system of claim 3, wherein the retention element comprises a retention body disposed around the shaft, the retention body is configured to contact each of the first detent member and the second detent member to displace the first detent member and the second detent member outwardly relative to the tube and into a respective one of the first aperture and the second aperture upon release of the depressible button to thereby firmly secure the seat leg to the bushing.

5. The modular passenger seat system of claim 3, wherein the shaft comprises an outer shaft surface, the retention element comprises a first recess and a second recess each formed on the outer shaft surface of the shaft, the first recess and the second recess are each sized to receive the first detent member and the second detent member, respectively, and, when the depressible button is depressed, the shaft is displaced to allow the first detent member and the second detent member to retract inwardly into a respective one of the first recess and the second recess to permit release of the tube from the bushing to enable removal of the passenger seat from the vehicle floor.

6. The modular passenger seat system of claim 3, further comprising a lock coupled to the depressible button, wherein the lock has an unlocked state configured to allow the depressible button to be depressed and a locked state configured to prevent the depressible button to be depressed.

7. The modular passenger seat system of claim 6, wherein the lock is configured to receive a key, and movement of the key received by the lock enables the lock to move between the unlocked state and the locked state.

8. The modular passenger seat system of claim 1, wherein the first detent member is a detent ball.

9. The modular passenger seat system of claim 1, wherein the first detent member comprises a detent leg having a planar shape, and the detent leg is pivotally coupled to the shaft to allow the detent leg to be displaced against the biasing member to enable the detent leg to retract inwardly into the tube to permit release of the tube from the bushing, thereby enabling removal of the passenger seat from the vehicle floor.

10. The modular passenger seat system of claim 1, wherein the first detent member has a curved shape that partially surrounds the shaft.

11. The modular passenger seat system of claim 1, wherein the tube has a main tube portion and a lower tube portion removably coupled to the main tube portion, the main tube portion includes internal tube threads, the lower tube portion includes external tube threads that threadedly engage the internal tube threads to removably couple the lower tube portion to the main tube portion, the lower end of the shaft includes a threaded protrusion, the threaded protrusion includes external shaft threads, the shaft includes a main shaft portion removably coupled to the lower end of the shaft, and the main shaft portion includes internal shaft threads that threadedly engage the external shaft threads to be removably coupled the lower end of the shaft to the main shaft portion of the shaft.

12. The modular passenger seat system of claim 1, wherein the vehicle is an airplane.

13. A vehicle, comprising:
a vehicle floor having a top side facing an interior cabin and a bottom side hidden from the interior cabin;
a plurality of bushings fixed to the vehicle floor and each of the bushings define a hole to access an opening through the bottom side of the vehicle floor;
a modular passenger seat system coupled to the vehicle floor through at least one of the plurality of bushings, wherein the modular passenger seat system includes:
a passenger seat having a seat base and a seat leg coupled to and extending outwardly away from the seat base, the seat leg having a distal end portion comprising a tube configured to be received in the hole of a first bushing of the plurality of bushings such that the tube accesses the opening of the vehicle floor, the tube comprising a sidewall having a first aperture and a second aperture;
a first detent member and a second detent member disposed within the first aperture and the second aperture in the sidewall of the tube, each of the first detent member and the second detent member configured to extend through a respective one of the first aperture and the second aperture and contact a lower portion of the first bushing of the plurality of bushings when the tube is received within the first bushing to retain the tube therein to secure the passenger seat to the vehicle floor;
a biasing member disposed within the tube;
a shaft being elongated such that an upper end of the shaft is disposed proximal to the seat base and a lower end of the shaft is disposed proximal to the tube, with the shaft housed inside of the seat leg; and
a depressible button coupled to the upper end of the shaft such that the depressible button is configured to move the shaft independently of the seat leg which causes the lower end of the shaft to displace the biasing member which enables the first detent member and the second detent member to retract inwardly into the tube to permit release of the tube from the hole of the bushing to enable removal of the passenger seat from the vehicle floor.

14. The vehicle of claim 13, wherein the passenger seat is a first passenger seat, the vehicle further includes a second passenger seat, and the vehicle further comprises a partition disposed between the first passenger seat and the second passenger seat to minimize fluid flow between the first passenger seat and the second passenger seat, the partition includes:
- a partition leg with a lower partition portion, the lower partition portion comprising a partition tube configured to be received through the vehicle floor, the partition tube comprising a partition leg sidewall having a first-partition aperture and a second-partition aperture;
- a first-partition detent member and a second-partition detent member disposed within the first-partition aperture and the second-partition aperture in the partition leg sidewall of the partition tube, each of the first-partition detent member and the second-partition detent member configured to extend through a respective one of the first-partition aperture and the second-partition aperture and contact a lower portion of a second bushing of the plurality of bushings when the partition tube is received within the second bushing to retain the tube therein to secure the partition to the vehicle floor;
- a partition biasing member disposed within the partition tube; and
- a partition shaft movably disposed within the partition leg, the partition shaft having a lower partition shaft end which when displaced against the partition biasing member enables the first-partition detent member and the second-partition detent member to retract inwardly into the tube to permit release of the tube from the second bushing to enable removal of the partition.

15. The vehicle of claim 14, wherein the partition further includes a transparent panel supported by the partition leg, wherein the transparent panel is disposed between the first passenger seat and the second passenger seat to minimize fluid flow between the first passenger seat and the second passenger seat while allowing light to pass between the first passenger seat and the second passenger seat through the transparent panel.

16. The vehicle of claim 14, wherein the vehicle is an airplane.

17. A method of installing a modular passenger seat system into a vehicle floor, comprising:
- depressing a depressible button within an armrest body of a passenger seat, wherein the passenger seat includes a seat leg with a distal end portion, the distal end portion comprises a tube configured to be received in a hole of a bushing fixed to the vehicle floor, the tube comprises a sidewall having a first aperture and a second aperture, the modular passenger seat system further includes a first detent member and a second detent member disposed within the first aperture and the second aperture in the sidewall of the tube, each of the first detent member and the second detent member is configured to extend through a respective one of the first aperture and the second aperture and contact a lower portion of the bushing when the tube is received within the hole of the bushing to retain the tube to the vehicle floor, the modular passenger seat system comprises a biasing member disposed within the tube and a shaft disposed within the seat leg, the shaft has a lower end disposed proximal to the biasing member and an upper end coupled to the depressible button;
- wherein depressing the depressible button moves the shaft independently of the seat leg in a first direction and when displaced against the biasing member enables each of the first detent member and the second detent member to retract inwardly into the tube;
- inserting the tube of the seat leg of the passenger seat into the hole of the bushing fixed to the vehicle floor while, at the same time, depressing the depressible button of the passenger seat; and
- releasing the depressible button which moves the shaft independently of the seat leg in a second direction opposite the first direction to lock the seat leg to the bushing after inserting the tube of the seat leg of the passenger seat into the hole of the bushing to allow the first detent member and the second detent member to move outwardly through the first aperture and the second aperture, respectively, to firmly secure the passenger seat to the vehicle floor.

18. The method of claim 17, further comprising unlocking a lock coupled to the depressible button before depressing the depressible button, wherein the lock has an unlocked state configured to allow the depressible button to be depressed which allows the shaft to move independently of the seat leg in the first direction and the second direction and a locked state configured to prevent the depressible button from being depressed which blocks movement of the depressible button such that the shaft remains stationary inside of the seat leg.

19. The method of claim 18, wherein the depressible button is depressed after moving the lock to the unlocked state to cause the shaft to be displaced relative to the tube.

20. The modular passenger seat system of claim 1, wherein the bushing includes an upper portion opposing the lower portion, and the bushing defines a hole through the upper portion and the lower portion, and wherein a least a portion of the tube is disposed through the hole of the bushing such that the portion of the tube is disposed below the upper portion and the lower portion which conceals the portion of the tube below the vehicle floor when the passenger seat is secured to the vehicle floor.

21. The method of claim 17, wherein the seat leg of the passenger seat is further defined as a first seat leg and the shaft is further defined as a first shaft, wherein the passenger seat further includes a second seat leg and a second shaft disposed inside of the second seat leg, and an upper end of the second shaft is coupled to the depressible button, wherein depressing the depressible button further comprises depressing the depressible button to move both of the first shaft and the second shaft in the first direction.

* * * * *